United States Patent
King

(10) Patent No.: US 10,491,639 B2
(45) Date of Patent: Nov. 26, 2019

(54) SCALABLE SECURITY ARCHITECTURE SYSTEMS AND METHODS

(71) Applicant: The Boeing Company, Chicago, IL (US)

(72) Inventor: Jeffrey G. King, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 330 days.

(21) Appl. No.: 14/660,859

(22) Filed: Mar. 17, 2015

(65) Prior Publication Data

US 2016/0337407 A1 Nov. 17, 2016

(51) Int. Cl.
| | |
|---|---|
| H04L 29/06 | (2006.01) |
| H04W 12/06 | (2009.01) |
| H04W 12/08 | (2009.01) |
| H04L 29/08 | (2006.01) |

(52) U.S. Cl.
CPC ........ *H04L 63/205* (2013.01); *H04L 63/0209* (2013.01); *H04L 63/08* (2013.01); *H04L 63/102* (2013.01); *H04L 63/18* (2013.01); *H04L 67/141* (2013.01); *H04W 12/06* (2013.01); *H04W 12/08* (2013.01)

(58) Field of Classification Search
CPC ....... H04L 63/205; H04L 63/08; H04L 63/18; H04L 63/102; H04L 67/141; H04L 63/0209; H04W 12/08; H04W 12/06
USPC .......................................................... 726/1
See application file for complete search history.

(56) References Cited

U.S. PATENT DOCUMENTS

| | | | | |
|---|---|---|---|---|
| 6,545,635 | B2 * | 4/2003 | Gaentgen | G01S 7/02 |
| | | | | 342/175 |
| 6,728,884 | B1 * | 4/2004 | Lim | H04L 63/0815 |
| | | | | 709/219 |
| 7,725,470 | B2 * | 5/2010 | Richards | G06F 16/90335 |
| | | | | 707/737 |
| 9,137,198 | B2 * | 9/2015 | Baniqued | H04L 41/0803 |
| 9,313,159 | B2 * | 4/2016 | Ross | H04L 45/308 |
| 9,489,227 | B2 * | 11/2016 | Oh | G06F 9/45533 |
| 9,621,604 | B2 * | 4/2017 | Ramakrishnan | H04L 65/4069 |
| 2001/0055305 | A1 * | 12/2001 | Oz | H04N 7/17318 |
| | | | | 370/389 |
| 2002/0120744 | A1 * | 8/2002 | Chellis | G06F 9/50 |
| | | | | 709/226 |
| 2002/0184217 | A1 * | 12/2002 | Bisbee | G06F 21/33 |

(Continued)

*Primary Examiner* — Farid Homayounmehr
*Assistant Examiner* — Sanchit K Sarker
(74) *Attorney, Agent, or Firm* — Haynes and Boone LLP

(57) ABSTRACT

Techniques are disclosed for systems and methods to provide a secure federated computing system for mobile structures. A secure federated computing system includes a secure system controller and one or more user modules each implemented with a secure system processor and configured to communicate over one or more system fabrics. The secure system controller and the user modules are configured to form secure communication channels to each other over the one or more system fabrics to facilitate a secure initialization procedure. Once the secure initialization procedure is complete, the secure system controller and the user modules can be used to dynamically allocate secure and non-secure system resources as needed or as indicated by a security rule set programmed into the secure system processor.

20 Claims, 12 Drawing Sheets

(56) References Cited

U.S. PATENT DOCUMENTS

| | | | | |
|---|---|---|---|---|
| 2003/0093187 A1* | 5/2003 | Walker | B64C 13/20 | 701/1 |
| 2005/0257249 A1* | 11/2005 | Shay | G06F 21/577 | 726/3 |
| 2007/0150932 A1* | 6/2007 | Milligan | H04L 63/101 | 726/1 |
| 2007/0291791 A1* | 12/2007 | English | H04L 45/00 | 370/469 |
| 2008/0144525 A1* | 6/2008 | Crockett | H04W 72/005 | 370/254 |
| 2008/0148402 A1* | 6/2008 | Bogineni | H04L 63/0428 | 726/22 |
| 2011/0131411 A1* | 6/2011 | Lin | H04L 12/4633 | 713/168 |
| 2013/0063612 A1* | 3/2013 | Royster | H04N 21/2146 | 348/207.99 |
| 2013/0219462 A1* | 8/2013 | Aratsu | G06F 21/10 | 726/1 |
| 2014/0007178 A1* | 1/2014 | Gillum | G06F 21/00 | 726/1 |
| 2015/0065085 A1* | 3/2015 | Sheikh Naziruddin | H04M 15/7652 | 455/406 |
| 2015/0071075 A1* | 3/2015 | Ramakrishnan | H04L 65/4069 | 370/236 |
| 2015/0106537 A1* | 4/2015 | Bobrek | G06F 5/10 | 710/54 |
| 2015/0237002 A1* | 8/2015 | Baniqued | H04L 61/2007 | 709/220 |
| 2015/0301912 A1* | 10/2015 | Rubin | H04B 17/382 | 714/4.11 |
| 2016/0337407 A1* | 11/2016 | King | H04L 63/205 | |

* cited by examiner

SCALABLE SECURITY ARCHITECTURE SYSTEMS AND METHODS

TECHNICAL FIELD

The present invention relates generally to secure computing system architectures and, more particularly, to systems and methods for implementing secure computing systems for use with mobile structures.

BACKGROUND

Commercial aircraft, ground vehicles, military aircraft, rotorcraft, unmanned air or land vehicles, and other mobile structures often include centralized or federated computing systems that are used to provide standards compliant computing resources for the various subsystems used to operate the mobile structure. Each subsystem typically includes user interfaces, sensors, actuators, and/or other modules, and a centralized or federated computing system can be used to interconnect the modules to their subsystems and/or interconnect the subsystems to each other. A centralized or federated computing system can also be configured to provide processing, storage, system communication (e.g., networking and/or system specific signal inputs and outputs), and/or other resources as needed to each subsystem or group of subsystems.

However, conventional centralized computing system architectures do not provide data and/or execution security across the available processing, storage, and communication resources, or they require complete adherence to proprietary interfaces and/or protocols that severely limit the upgrade path of components of the centralized computing system and of any subsystems coupled to the centralized computing system. In some cases, a lack of data and/or execution security can further limit the upgrade path due to various regulatory restrictions, such as unsecured technology export restrictions. Lack of security and limited upgrade path can severely negatively impact the marketability of the centralized system, the subsystems, and even the mobile structure in which they are installed, such as when an end user prefers not to be locked into using a particular manufacturer's selection of subsystems and does not want to bear the expense of removing the centralized computing system from the chassis of the mobile structure and replacing it wholesale just to upgrade a selection of subsystems or, conversely, of replacing all subsystems when the centralized computing system is upgraded or one subsystem upgrade requires a secure computing environment. Thus, there is a need for an improved methodology to provide a scalable and secure federated computing system architecture, particularly for use in the operation of mobile structures.

SUMMARY

Techniques are disclosed for systems and methods to provide a secure federated computing system for mobile structures. A secure federated computing system may include a secure system controller and one or more user modules each implemented with a common secure system processor and configured to communicate over one or more system fabrics. The secure system controller and the user modules are configured to form secure communication channels to each other over the one or more system fabrics to facilitate a secure initialization procedure. Once the secure initialization procedure is complete, the secure system controller and the user modules can be used to dynamically allocate secure and non-secure system resources as needed or as indicated by a security rule set programmed into the secure system processor.

In one embodiment, a method may include detecting a system resource request transmitted over a system fabric; determining a security status of the system resource request with respect to a security rule set, wherein the security rule set comprises at least one communication, input/output (I/O), and/or execution partition associated with one or more user modules; and allocating system resources based, at least in part, on the determined security status of the system resource request.

In another embodiment, a system may include one or more user modules configured to communicate with each other over a system fabric; and a secure system controller adapted to couple to the system fabric, wherein the secure system controller is configured to detect a system resource request transmitted over the system fabric; determine a security status of the system resource request with respect to a security rule set, wherein the security rule set comprises at least one communication, input/output (I/O), and/or execution partition associated with the one or more user modules; and allocate system resources based, at least in part, on the determined security status of the system resource request.

In a further embodiment, a method may include coupling a secure system controller and one or more user modules to a system fabric for a federated computing system; coupling a secure programming station to the secure system controller; and programming the secure system controller according to a security rule set, wherein the security rule set comprises at least one communication, input/output (I/O), and/or execution partition associated with the one or more user modules.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like devices illustrated in one or more of the figures.

DETAILED DESCRIPTION

In accordance with one or more embodiments of the present disclosure, secure federated computing systems may include a user replaceable secure system controller (SSC) and one or more user modules each implemented with a common secure system processor and configured to communicate over one or more system fabrics. In various embodiments, the secure system controller and the user modules may be configured to form secure communication channels to each other over the one or more system fabrics to facilitate a secure initialization procedure. Once the secure initialization procedure is complete, the secure system controller and the user modules can be used to dynamically allocate secure and non-secure system resources as needed or as indicated by a security rule set programmed into the secure system processor.

In some embodiments, one or more of the user modules may be implemented as a commercial-off-the-shelf (COTS) user module coupled with a mezzanine that is configured to conform the COTS user module to the security features offered by the secure system controller. As a result, such systems are user-upgradeable in gradual stages, module by module, which allows a user to allocate upgrade costs over time as needed. If very high levels of security are required, such as for military aircraft and/or export restricted systems, embodiments of the present disclosure may be used to provide end-to-end encrypted and authenticated communication, input/output (I/O), execution, storage, and/or other system resources, as described herein.

In various embodiments, the disclosed secure system controller (SSC) may be configured to manage all known system states such as boot, software loading, and implementation of various security domains or partitions and their corresponding firewalls. The SSC may be networked to internal and external components via a communication bus and/or a segregated security system fabric. For example, user modules may be implemented with trusted or untrusted software, and the security posture provided by the SSC and the other elements of the system may be adjusted accordingly.

Figure 1:
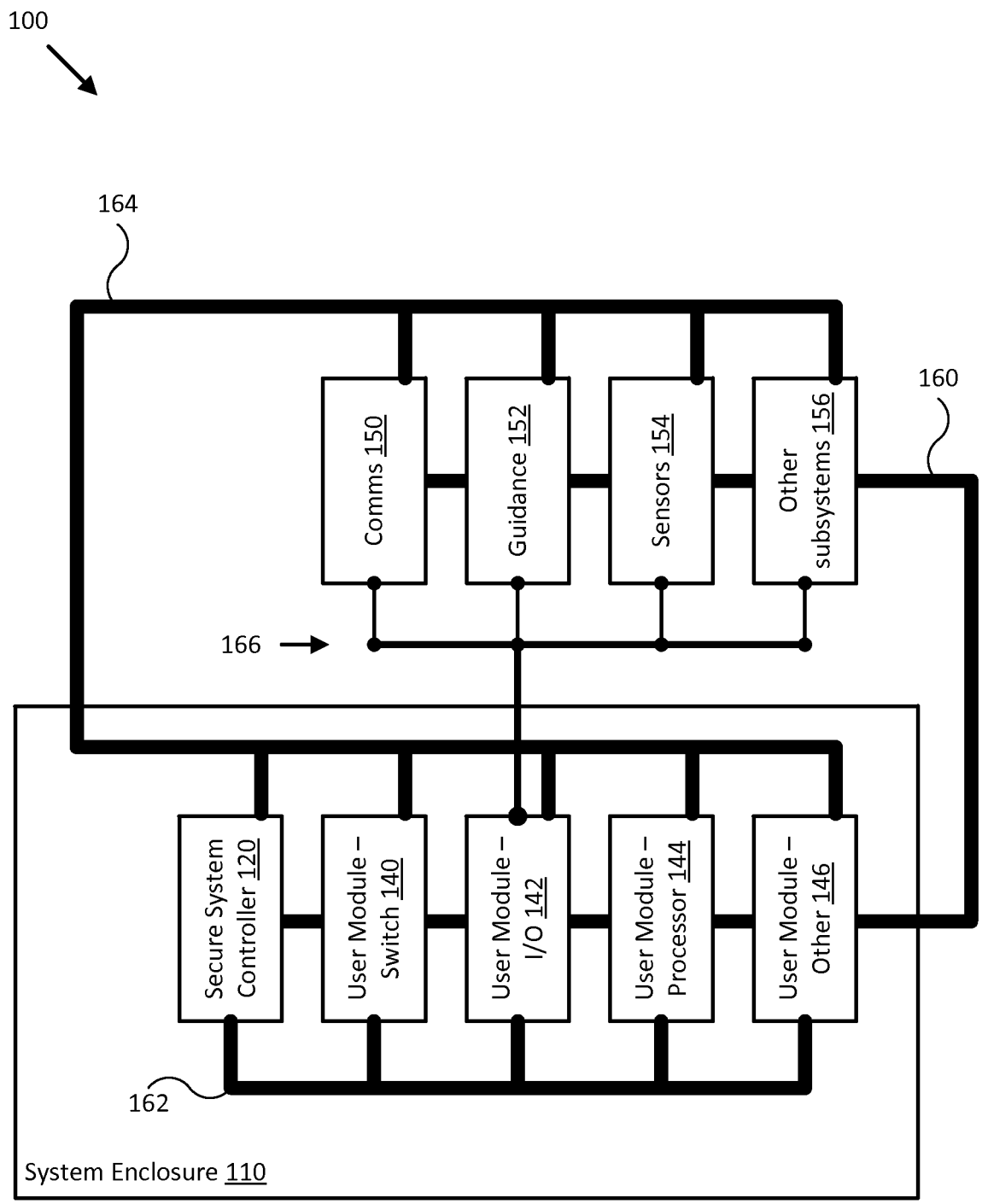
FIG. 1 illustrates a block diagram of a secure federated computing system in accordance with an embodiment of the disclosure.

FIG. 1 illustrates a block diagram of a secure federated computing system 100 in accordance with an embodiment of the disclosure. As shown in FIG. 1, system 100 may include a secure system controller (SSC) 120 and one or more user modules 140-146 mounted within or otherwise coupled to a system enclosure 110. In various embodiments, system 100 may be implemented with one or more busses or system fabrics 160-166 each of which may be configured to facilitate management of user modules 140-146 and/or corresponding subsystems 150-156 by secure system controller (SSC) 120, such as by providing infrastructure for communication, power, and/or other signals to and among user modules 140-146 and/or subsystems 150-156. System enclosure 110 may be implemented as a backplane, printed circuit board (PCB, or other type of computing system infrastructure, for example, and may be configured to provide power, power regulation, and physical support for SSC 120, user modules 140-146, and/or at least portions of system fabrics 160-166 and corresponding interfaces. In some embodiments, system enclosure 110 may be mountable within a chassis of a mobile structure and/or be configured to provide physical security for at least a portion of system 100. Electronic and information security of system 100 is provided through interaction between SSC 120, user modules 140-146, and subsystems 150-156 over system fabrics 160-166, as described herein.

SSC 120 may be configured to couple to system fabrics 160, 162, and/or 164 and manage operation of user modules 140-146 through system fabrics 160, 162, and/or 164. In particular, SSC 120 may be configured to secure communications, I/O, execution, and/or other operations of system 100 by applying a security rule set to operations of system 100. For example, in some embodiments, SSC 120 may be configured to initialize system 100 in a secure fashion by powering user modules 140-146 and blocking communications between user modules 140-146 until at least a portion of a security rule set is used to secure communications between user modules 140-146, as described herein. Once system 100 is initialized, SSC 120 may be configured to detect a system resource request transmitted over system fabrics 160-166, determine a security status of the system resource request with respect to a security rule set, and allocate system resources based, at least in part, on the determined security status of the system resource requests. For example, SSC 120 may be configured to identify elements of system 100, cross reference the elements against a security rule set, allow or deny a system resource request, and/or allocate and/or segregate a system resource depending on a determined security status of the system resource request.

Although depicted as physically separate in FIG. 1, one or more of system fabrics 160-166 may be integrated together within one or more buses, for example, and in some embodiments may be implemented according to a variety of wired and/or wireless communication techniques, including voltage signaling, PCI Express, Infiniband, Serial Rapid I/O, Ethernet, 10 Gb Ethernet, Fibre Channel, 1553, CANBus, WiFi, Bluetooth, Zigbee, Xbee, Micronet, or other medium and/or short range wired and/or wireless networking protocols and/or implementations, for example. In such embodiments, each element of system 100 may include one or more modules and/or interfaces supporting wired, wireless, and/or a combination of wired and wireless communication techniques. In some embodiments, system fabrics 160-166 may be implemented as combinations of various communication techniques and/or buses. As defined herein, "high speed system fabric" may refer to system fabrics implemented according to PCI Express, Infiniband, Serial Rapid I/O, Ethernet, 10 Gb Ethernet, Fibre Channel, and/or other system fabrics with similar throughput and/or latency characteristics.

In various embodiments, system 100 may be integrated with a mobile structure and include one or more user modules and/or subsystems selected to facilitate operation of the mobile structure. For example, system 100 may be integrated with a commercial or private aircraft, a ground vehicle, a military aircraft, a rotorcraft, an unmanned vehicle, and/or other mobile structure, and user modules 140-146 and subsystems 150-156 may be selected to facilitate operation of the vehicle.

Typically, a federated computing system (e.g., a centralized computing system with allocatable shared resources) for a mobile structure includes a switch module 140, an input/output (I/O) module 142, and a processor module 144, and may include one or more additional user modules (other user module 146) that can be used to facilitate a relatively unique need in operating a particular mobile structure for a particular user. For example, in some embodiments, other user module 146 may be configured to provide monitoring and/or control functions for a weapons and/or anti-weapons subsystem, an in-air refueling rig subsystem, a hybrid propulsion subsystem, and/or other platform specific subsystem for a mobile structure. In general, such platform specific subsystems may require a dedicated user module (e.g., other user module 146) in addition to, or as an alternative to, switch module 140, I/O module 142, and/or processor module 144, and separate from any corresponding subsystem (e.g., other subsystems 156) to ensure high speed and secure communications within system 100.

As shown in FIG. 1, switch module 140 may be configured to manage communications between SSC 120 and each user module and/or subsystem configured to communicate across system fabrics 160, 162, and/or 164. Such management may include allocating communication resources (e.g., interfaces, bandwidth, quality of service, priority, signaling frequency, and/or other communication resources) to particular user modules, subsystems, and/or system fabrics. In some embodiments, system fabric 160 may correspond to a high speed system fabric, for example, that can be used to provide communications and/or power to SSC 120, user modules 140-146, and/or subsystems 150-156. System fabric 162 may also correspond to a high speed system fabric, for example, and may be used to segregate secure (e.g., trusted) communications between elements of system 120 from non-secure (e.g., untrusted) communications. As noted herein, in some embodiments, system fabrics 160 and 162 may be integrated into a single physical fabric such that secure and non-secure signals are communicated over the same physical interface to the fabric, but where portions of the fabric (e.g., conductive traces) corresponding to the secure and non-secure communications are physically segregated from each other, for example, and/or communication quanta (e.g., packets) are segregated from each other through various signaling protocols (e.g., using time division, source/destination addressing, and/or other signaling protocols). System fabric 164 may be implemented as a high speed system fabric or other system fabric as needed for the particular platform; in some embodiments system fabric 164 may be implemented as an Ethernet or 10 Gb Ethernet system fabric.

In some embodiments, switch module 140 may be configured to secure communications transmitted over system fabrics 160, 162, and/or 164 by providing one or more communication partitions for the system fabrics. For example, switch module 140 may be configured to receive at least a portion of a security rule set from SSC 120 (e.g., over one or more of system fabrics 160, 162, and/or 164) that includes a communication partition that segregates secure and non-secure transmissions between I/O module 142 and processor module 144. Such communication partition may include one or more communication firewalls configured to selectively allow, disallow, and/or prioritize communications between I/O module 142 and processor module 144 based on source, destination, type, length, time, and/or other communication attributes indicated in the security rule set.

Also shown in FIG. 1, I/O module 142 may be configured to communicate with subsystems 150-156 over system fabric 166 and provide such communications to other user modules over system fabrics 160, 162, and/or 164. In some embodiments, system fabric 166 may include an analog and/or digital (e.g., discrete) interface to one or more subsystems 150-156. For example, one or more sensors 154 may require a shielded analog power and/or signal cable an interface to enable the sensors 154 to provide reliable sensor information to system 100. In such embodiments, system fabric 166, or a portion thereof, may be configured to provide the shielded cable and interface to such sensors, and I/O module 142 may be configured to provide power and receive analog signals from such sensor over system fabric 166 and convert the signals to sensor information that can be distributed throughout system 100 over system fabrics 160, 162, and/or 164. In various embodiments, I/O module 142 may implemented with one or more amplifiers, modulators, phase adjusters, beamforming components, digital to analog converters (DACs), analog to digital converters (ADCs), various interfaces, antennas, and/or other analog and/or digital components enabling system 100 to interface with each of subsystems 150-156 to facilitate wired and/or wireless communications among elements of system 100.

In some embodiments, I/O module 142 may be configured to secure signals transmitted over system fabric 166 by providing one or more I/O partitions for system fabric 166. For example, I/O module 142 may be configured to receive at least a portion of a security rule set from SSC 120 (e.g., over one or more of system fabrics 160, 162, and/or 164) that includes an I/O partition that segregates secure and non-secure transmissions between I/O module 142 and subsystems 150-156. Such I/O partition may include one or more I/O firewalls and/or groups of analog electronics configured to selectively segregate signals between I/O module 142 and subsystems 150-156 based on source, destination, type, length, time, and/or other I/O attributes indicated in the security rule set.

Processor module 144 may be configured to provide allocatable processing resources for use by other elements of system 100. For example, guidance subsystem 152 may be configured to provide a guidance application to processor module 144 (e.g., over system fabric 160, 164, and/or 166), and processor module 144 may be configured to execute the guidance application to receive position and/or orientation information from sensors 154 (e.g., through I/O module 142) and provide calculated guidance control parameters to guidance subsystem 152 for guidance control of a mobile structure, for example, or for display to a user through a user interface (e.g., other subsystems 156).

In some embodiments, processor module 144 may be configured to secure execution of applications transmitted to processor module 144 by providing one or more execution partitions within processor module 144. For example, processor module 144 may be configured to receive at least a portion of a security rule set from SSC 120 (e.g., over one or more of system fabrics 160, 162, and/or 164) that includes an execution partition that segregates secure from non-secure application execution within processor module 144.

Such execution partition may include one or more contiguous or semi-contiguous allocations of processing resources (e.g., memory, cache, processing pipelines, bandwidth, processing time, and/or other processing resources) configured to selectively address and/or execute applications within processor module 144 based on source, destination, type, length, time, and/or other application attributes indicated in the security rule set.

Other user module 146 may correspond to one or more platform specific user modules (e.g., weapons computing modules, surveillance computing modules), for example, and/or additional allocatable system resources, such as additional switching modules, I/O modules, and/or processing modules. In some embodiments, other user module 146 may correspond to a storage module, for example, and be configured to provide allocatable data storage resources (e.g., hard drives, optical media, solid state memory, and/or other relatively long term data storage mediums) for system 100. In such embodiments, user module 146 may be configured to secure stored data by segregating and/or encrypting the stored data according to secure storage partitions indicated in a security rule set provided by SSC 120, for example.

More generally, any of user modules 140-146 may be configured to provide secure communications, I/O, and/or processing as indicated in a security rule set provided by SSC 120. For example, although switch module 140 is primarily dedicated to managing communications, in some embodiments, switch module 140 may be configured to execute secure and non-secure applications in corresponding secure and non-secure execution partitions, and the secure and non-secure applications may be provided by SSC 120, user modules 142-146, and/or other elements of system 100. Similarly, I/O module 142 and processor module 144 may be configured to secure communications to and from themselves according to one or more communication partitions indicated in a security rule set provided by SSC 120.

As noted above, subsystems 150-156 may include a set of subsystems selected to facilitate operation of a mobile structure. For example, communications subsystem 150 may include circuitry and devices configured to facilitate data and/or voice communications between a mobile structure (and/or a user of the mobile structure) and a communications network, such as radio network, a cellular network, the Internet, and/or other communications networks. Guidance subsystem 152 may include circuitry and devices configured to facilitate guidance of a mobile structure, such as position, orientation, speed, and/or acceleration sensors, control surface sensors/actuators, steering sensors/actuators, propulsion monitoring and/or actuation devices, user interfaces (e.g., a yoke, steering wheel, pedal, selector switches, or other user interfaces). Sensors 154 may include circuitry and devices configured to sense operational parameters of a mobile structure, such as guidance sensors, RADAR, internal environment sensors, external environment sensors, and propulsion system monitoring sensors. Other subsystems 156 may correspond to various user interfaces, actuators, monitoring subsystems, weapons subsystems, surveillance subsystems, additional communication, guidance, or sensor subsystems, and/or other subsystems. Each subsystem 150-156 may be configured to communicate with each other and/or user modules 140-146 over one or more system fabrics 160, 164, and/or 166. In some embodiments, one or more subsystems 150-156 may be configured to interface with system 100 only over a portion of system fabric 166.

In general, each of the elements of system 100 (e.g., SSC 120, user modules 140-146, subsystems 150-156) may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for securing system 100, for example, or for transmitting and/or receiving communications between one or more devices of system 100. In one embodiment, such method may include instructions for forming one or more communication links between various devices of system 100. In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

Figure 2:
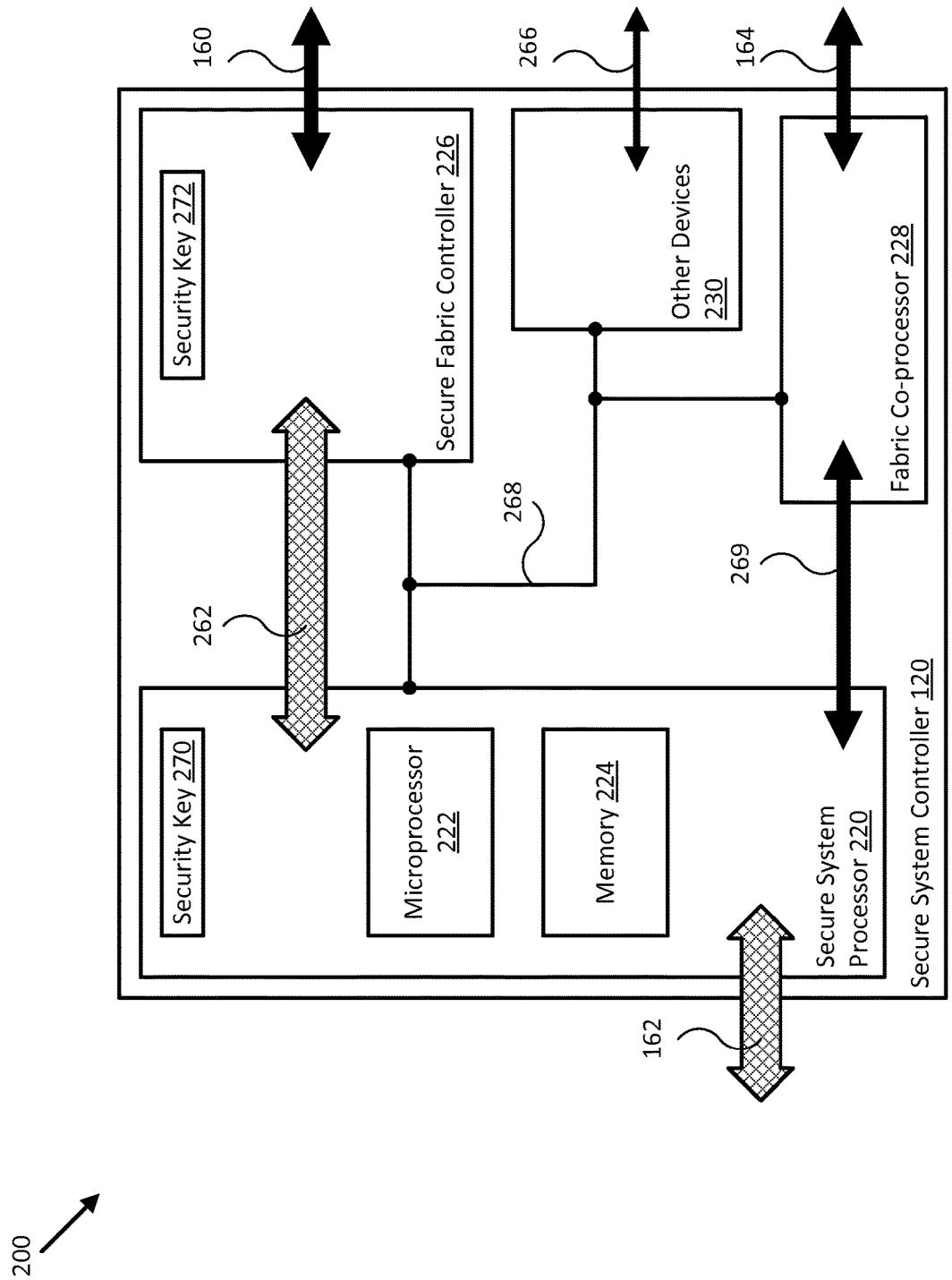
FIG. 2 illustrates a block diagram of a secure system controller for a secure federated computing system in accordance with an embodiment of the disclosure.

FIG. 2 illustrates a block diagram 200 of secure system controller 120 for secure federated computing system 100 in accordance with an embodiment of the disclosure. In various embodiments, SSC 120 may be mounted within or otherwise coupled to system enclosure 110 and be configured to manage user modules 140-146 and/or other elements of system 100 over system fabrics 160, 162, and/or 164. In addition, SSC 120 may be configured to provide various levels of security for operation of system 100.

As shown in FIG. 2, SSC 120 includes secure system processor 220 and secure fabric controller 226, and may optionally include fabric co-processor 228 and other devices 230, each of which may be configured to interface to each other and the rest of system 100 over system fabrics 160, 162, and 164 and internal buses 262, 268, and 269. Each of the elements of SSC 120 may be implemented with one or more logic devices, as described herein, as appropriate.

In embodiments where system 100 includes physically segregated system fabrics 160 and 162, SSC 120 may be configured to communicate with other user modules of system 100 using a secure protocol established over a physically segregated secure system fabric (designated as system fabric 162 in FIG. 2). Such embodiments provide a higher level of operational security as compared to embodiments where, for example, system fabrics 160 and 162 are not physically segregated and there is a risk that secure communications can be monitored by other devices coupled to system fabric 160 and/or blocked by other communication traffic on system fabric 160. In embodiments where system fabrics 160 and 162 are not physically segregated, SSC 120 may be configured to communicate with other user modules of system 100 using a secure protocol established over a hybrid system fabric (designated as system fabric 160 in FIG. 2), which can be used to carry both secure and non-secure communications. Conceptually, in such embodiments, system fabric 162 and 160 may be combined to use a single physical interface and/or fabric. In some embodiments, system fabric 160 may correspond to a standard federated computing system bus commonly used by a variety of common-of-the-shelf (COTS) user modules, so as to provide interoperability with COTS user modules. In further embodiments, system fabric 162 may correspond to an extended standard federated computing system bus commonly available in standard federated computing systems. In such embodiments, SSC 120 may be configured to use the extended standard federated computing system bus to implement any of the methods described herein, which allows embodiments to be retrofitted into standard system enclosures without requiring complete replacement of the entire system.

As shown in FIG. 2, secure system processor 220 may be implemented with microprocessor 222, memory 224, and security key 270. Microprocessor 222 and memory 224 may be configured to execute, store, and receive software instructions implementing any of the methods described herein. Security key 270 may be implemented as one or more secure data storage features (e.g., fuses) embedded within secure system processor 220, for example, and provide a secure private key for use in establishing encrypted and/or authenticated communications between secure system processor 220 and other elements of SSC 120 or system 100, such as through various public key cryptography protocols and/or other authentication and/or encryption protocols. In some embodiments, security key 270 may correspond to a biometric characteristic of an authenticated user or system administrator, such as a fingerprint, iris structure, voice print, and/or other biometric, that is stored as security key 270.

In various embodiments, secure system processor 220 may be configured to establish an authenticated and/or encrypted communication link with secure fabric controller 226 over internal secure bus 262 (e.g., using its security key 272), and secure fabric controller 226 may be configured to manage operation of system fabric 160 (e.g., which may be one or more high speed system fabrics) to provide authenticated and/or encrypted communications between secure system processor 220 and user modules 140-146 over system fabric 160 while at the same time allowing relatively less secure communications over the same system fabric 160. In some embodiments, secure fabric controller 226 may use its security key 272 to establish authenticated and/or encrypted communication links to other devices coupled to system fabric 160 separate from communications between secure system processor 220 and secure fabric controller 226. In further embodiments, secure fabric controller 226 may be configured to monitor performance of system fabric 160 and/or control system fabric 160 to provide priority to secured communications to help ensure the secure communications reach their destinations along system fabric 160.

In particular, secure fabric controller 226 may be configured to secure communications transmitted over system fabric 160 by providing one or more communication partitions for system fabric 160. For example, secure fabric controller 226 may be configured to receive at least a portion of a security rule set from secure system processor 220 (e.g., over internal bus 262) that includes a communication partition that segregates secure and non-secure transmissions over system fabric 160. Such communication partition may include one or more communication firewalls configured to selectively allow, disallow, and/or prioritize communications over system fabric 160 based on source, destination, type, length, time, and/or other communication attributes indicated in the security rule set.

In other embodiments, secure system processor 220 may be configured to establish an authenticated and/or encrypted communication link directly to user modules 140-146 (e.g., using its security key 270 and/or other security keys) over system fabric 162 (e.g., an end-to-end segregated secure system fabric) separate from communications over bus 262 and system fabric 160. Secure system processor 220 may use either or both system fabrics 160 and/or 162 to manage operation (e.g., boot, communication channels, resource requests) of any user module or subsystem of system 100 coupled to system fabric 160 and/or 162.

In further embodiments, SSC 120 may include fabric co-processor 228, and secure system process 220 may be configured to interface with other devices in system 100 over system fabric 164 (e.g., an Ethernet and/or 10 Gb Ethernet system fabric). In such embodiments, fabric co-processor 228 may be configured to perform fabric-specific functions to facilitate communication over system fabric 164, and internal bus 269 and system fabric 164 may be implemented as a hybrid system fabric (e.g., used to carry both secure and non-secure communications).

Also shown in FIG. 2 are other devices 230, external bus 266, and internal bus 268. In various embodiments, other devices 230 may be configured to interface with an external programming station over external bus 266, for example, to receive a security rule set, firmware, trusted and untrusted applications, additional security keys (e.g., to interface with user modules) and/or other data, and/or to provide a secure user interface separate from the user modules and subsystems shown in FIG. 1. Internal bus 268 may be used to allow secure system processor 220 to control and/or manage operation of secure fabric controller 226, fabric co-processor 228, and/or other devices 230, in addition to communicating with an external programming station using other devices 230 and/or external bus 266.

Figure 3:
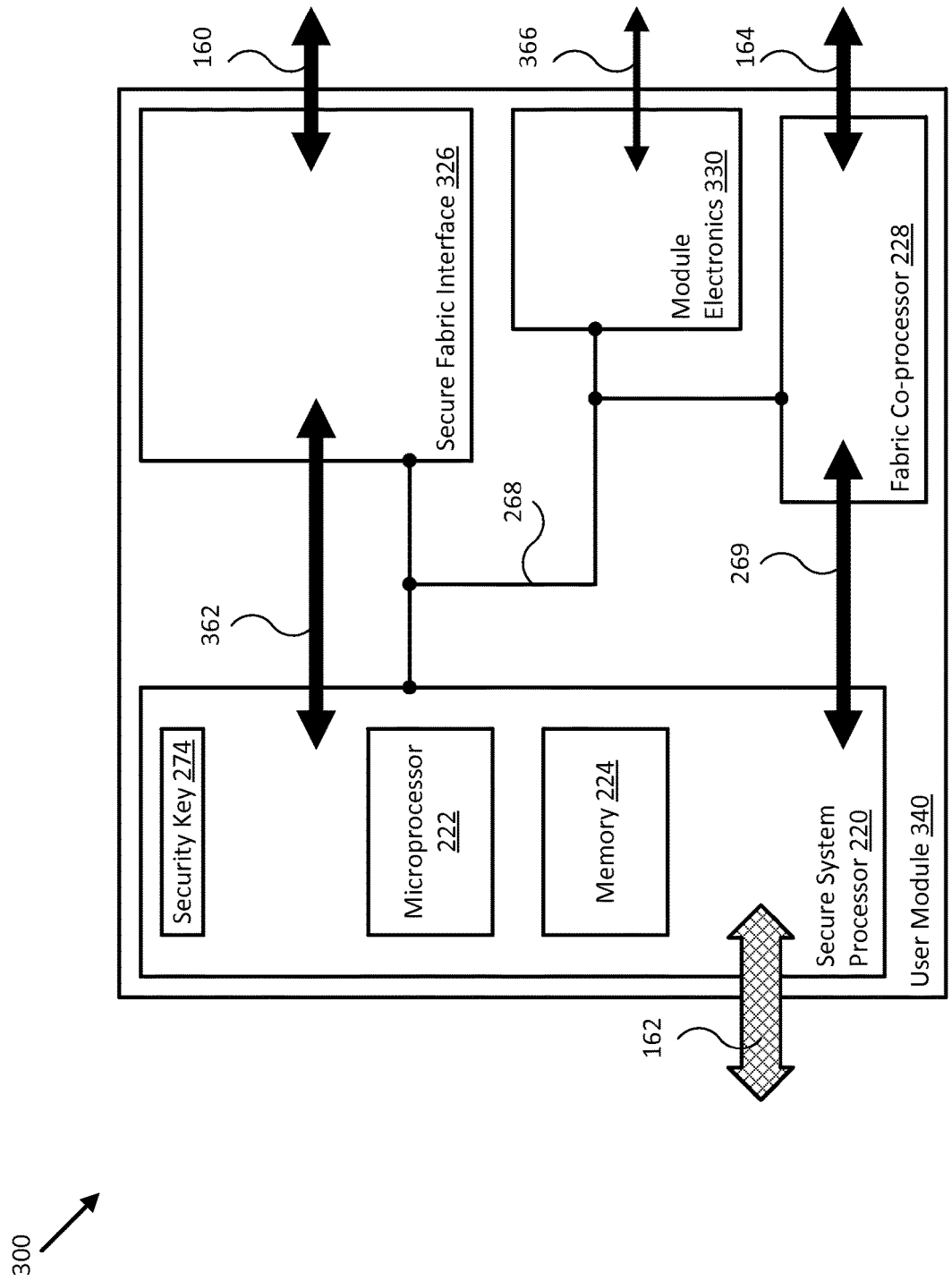
FIG. 3 illustrates a block diagram of a user module for a secure federated computing system in accordance with an embodiment of the disclosure.

FIG. 3 illustrates a block diagram 300 of a user module (e.g., user modules 140-146) for secure federated computing system 100 in accordance with an embodiment of the disclosure. In typical embodiments, user module 340 may be mounted within or otherwise coupled to system enclosure 110 and be configured to be managed by SSC 120 over system fabrics 160 and/or 162. User module 340 may also be coupled to subsystems 150-156 via bus 366, as described herein. In various embodiments, user module 340 may be configured to provide various levels of security for operation of user module 340 in addition to user module-specific functions and/or resources (e.g., switching resources, I/O resources, processing resources, and/or other resources).

As shown in FIG. 3, user module 340 includes secure system processor 220, secure fabric interface 326, and module electronics 330, and may optionally include fabric co-processor 228, each of which may be configured to interface to each other and the rest of system 100 over system fabrics 160, 162, and 164 and internal buses 362, 268 and 269. Each of the elements of user module 340 may be implemented with one or more logic devices, as described herein, as appropriate.

As can be seen by comparing FIG. 3 with FIG. 2, user module 340 includes many of the same features as SSC 120 but includes its own security key 274 and secure fabric interface 326 coupled to secure system processor 220 over hybrid internal bus 362 (e.g., used to convey secure and non-secure communications). Because user module 340 utilizes the same type secure system processor 220 as SSC 120, embodiments may be implemented inexpensively by reusing security validated hardware and software across multiple hardware configurations, as described herein. In various embodiments, user module 340 may be manufactured by the same manufacturer of SSC 120.

Secure fabric interface 326 may in some embodiments lack its own security key, but secure fabric interface 326 may be configured, similar to secure fabric controller 226 of FIG. 2, to facilitate secure communications among any user modules coupled to system fabric 160 (e.g., through implementation of communication partitions, for example). For example, secure fabric interface 326 may be configured to secure communications transmitted to user module 340 over system fabric 160 by implementing one or more communication firewalls configured to selectively allow, disallow, and/or prioritize communications over system fabric 160 based on source, destination, type, length, time, and/or other communication attributes indicated in a security rule set.

Module electronics 330 and external bus 366 represent electronics and interfaces specific to the type of user module 340 and/or system resources user module 340 is configured to provide. For example, in one embodiment, module electronics 330 may correspond to fabric switch electronics, and external bus 366 may correspond to system fabric 164 (e.g., user module 340 corresponds to user module 140). In other embodiments, module electronics 330 may correspond to I/O electronics (e.g., amplifiers, DACs, ADCs, etc.), processing electronics (e.g., processors, memory structures), storage electronics, weapons management electronics, surveillance management electronics, and/or other user module-specific electronics, and external bus 366 may correspond to system fabric 166, an interface for an external programming station, a weapons subsystem interface, a surveillance subsystem interface, and/or other user module-specific subsystem interface.

Figure 4:
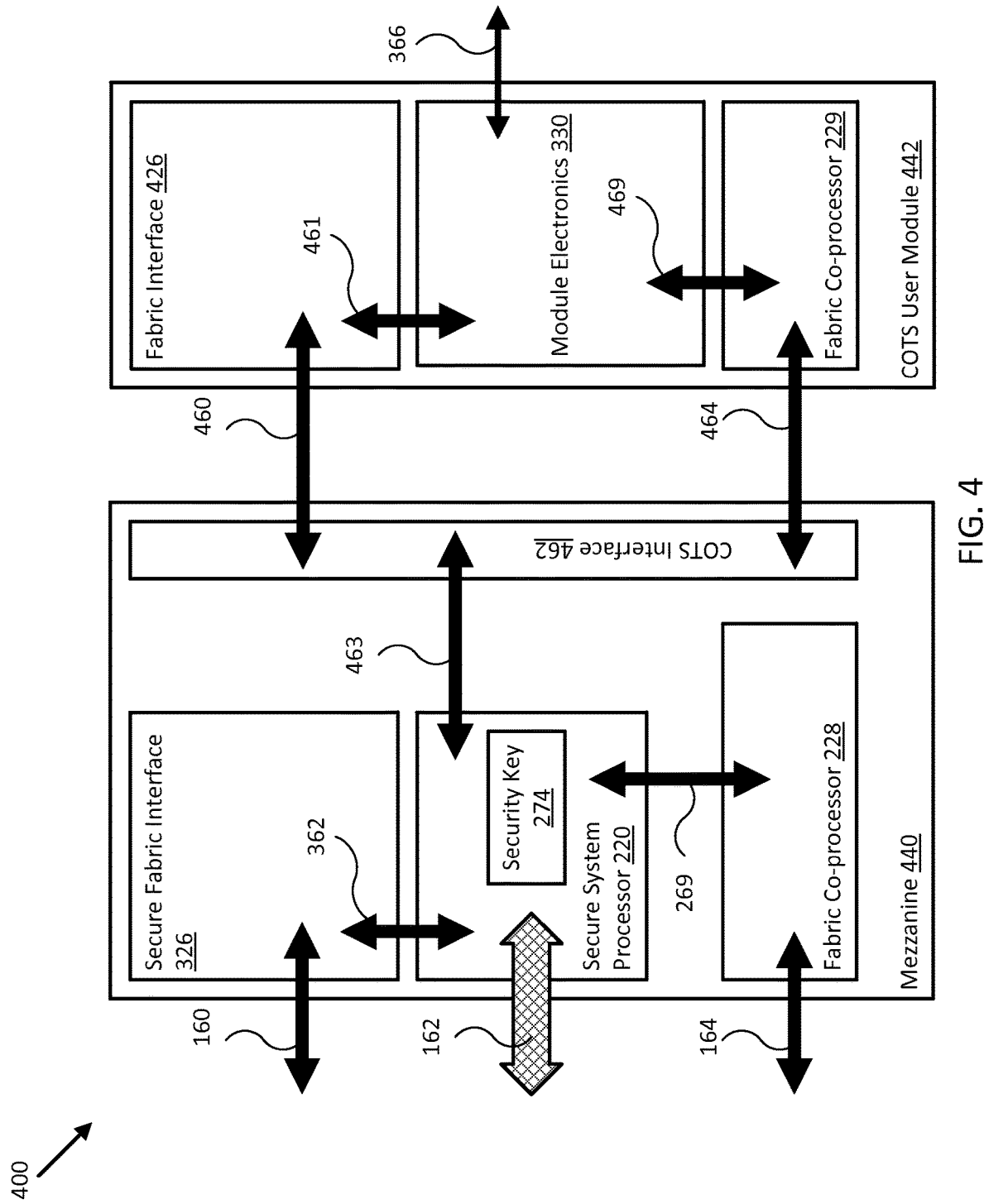
FIG. 4 illustrates a secure COTS user module for a secure federated computing system in accordance with an embodiment of the disclosure.

FIG. 4 illustrates a block diagram 400 of a secured COTS user module 442 for secure federated computing system 100 in accordance with an embodiment of the disclosure. As shown in FIG. 4, COTS user module 442 may be secured by coupling a mezzanine 440 between COTS user module 442 and an interface (e.g., system enclosure 110) to various system fabrics (e.g., system fabrics 160, 162, and/or 164). In particular, COTS user module 442 and mezzanine 440 may be mounted within or otherwise coupled together to system enclosure 110 and be configured to be managed by SSC 120 over system fabrics 160 and/or 162. In various embodiments, COTS user module 442 may be configured to provide user module-specific functions and/or resources (e.g., switching resources, I/O resources, processing resources, and/or other resources) and, in some embodiments, may be coupled to subsystems 150-156 via bus 366, similar to user module 340 in FIG. 3. As shown, mezzanine 440 may be configured to provide various levels of security for operation of COTS user module 442, as described herein. Each of the elements of mezzanine 440 and/or COTS user module 442 may be implemented with one or more logic devices, as described herein, as appropriate.

In the embodiment provided in FIG. 4, mezzanine 440 and COTS user module 442 include many elements similar to those described with reference to user module 340 of FIG. 3. For example, mezzanine 440 includes secure system processor 220 and secure fabric interface 326, and may optionally include fabric co-processor 228, each of which may be configured to interface to each other and the rest of system 100 over system fabrics 160, 162, and 164 and internal buses 362 and 269 (and/or an internal bus similar to internal bus 268 of FIGS. 2-3). Also, COTS user module 442 may include module electronics 330, external bus 366, and/or fabric co-processor 229 (e.g., similar to fabric co-processor 228), each of which operate similar to those features described with reference to FIG. 3.

In addition, mezzanine 440 includes COTS interface 462 and internal bus 463 allowing secure system processor 220 to mediate communications between COTS user module 442 and other elements of system 100 coupled to system fabrics 160-164. Moreover, mezzanine 440 may also be configured to communicate with COTS user module 442 over buses 460 and/or 464 (e.g., corresponding to system fabrics 160 and 164) as shown. Through such communication, mezzanine 440 may be configured to provide secure operation of COTS user module 442, as managed by SSC 120 over system fabrics 160 and/or 162, while COTS user module 442 is integrated with system 100. For example, in some embodiments, mezzanine 440 may be configured to execute an application interface tailored to COTS user module 442 in order to translate system management commands and secure system resource requests (e.g., as determined relative to a security rule set) to corresponding commands/resource requests recognized by COTS user module 442.

Because mezzanine 440 utilizes the same type secure system processor 220 as SSC 120, embodiments may be implemented inexpensively by reusing security validated hardware and software across multiple hardware configurations, as described herein. In various embodiments, mezzanine 440 may be manufactured by the same manufacturer of SSC 120. While COTS user module 442 may be manufactured by a different manufacturer, operation of COTS user module 442 may be rendered relatively secure through operation of SSC 120 and mezzanine 440 without requiring the additional expense of replacing COTS user module 442.

As noted in the description of FIG. 3, secure fabric interface 326 may be configured to secure communications transmitted to mezzanine 440 and/or COTS user module 442 over system fabric 160 by implementing one or more communication firewalls configured to selectively allow, disallow, and/or prioritize communications over system fabric 160 based on source, destination, type, length, time, and/or other communication attributes indicated in a security rule set provided by SSC 120. Module electronics 330 and external bus 366 represent electronics and interfaces specific to the type of COTS user module 442 and/or system resources COTS user module 442 is configured to provide. Fabric co-processor 229 may operate similar to fabric co-processor 228, and internal buses 461 and 469 (and/or an internal bus similar to internal bus 268 of FIGS. 2-3) may be configured to interface elements of COTS user module 442 to each other.

In various embodiments, COTS interface 462 may be configured to replicate a standard federated computing system interface so as to couple system fabric 460 and/or 464 directly to elements of mezzanine 440, such as secure system processor 220. In some embodiments, bus 464 may be physically separate from bus 460, and COTS interface 462 may only couple to bus 460. In such embodiments, bus 464 may be coupled directly to system fabric 164 (e.g., in an unsecured fashion), which typically reduces overall security for system 100 because there is a higher risk of monitoring secure communications over system fabric 164 (e.g., over bus 464) and/or unmanaged congestion.

In additional embodiments, COTS user module 442 may be coupled directly to system enclosure 110, such as when mezzanine 440 is omitted due to cost, lack of a reliable application interface, or other concern. In such embodiments, the security of system 100 is reduced further because there is a higher risk of monitoring secure communications over system fabric 160 (e.g., bus 460) and/or similarly unmanaged congestion. However, even where mezzanine 440 is absent with respect to one or more COTS user modules (e.g., corresponding to one or more user modules 140-146 of FIG. 1), overall security is still greater with SSC 120 alone (e.g., through control of system fabric 160 using secure fabric controller 226) or SSC 120 coupled with any one or more secured user modules (e.g., corresponding to user module 340 or the combination of mezzanine 440 and COTS user module 442). As such, the security level of system 100 gradually increases as elements of the embodiments described herein are added to the system in different combinations. In various embodiments, the highest security level would be a system including SSC 120, all user modules 340, and a physically separate/segregated secure system fabric 162 (e.g., an optional feature of system enclosure 110). In other embodiments, the lowest security level would be a system including SSC 120 and only unsecured COTS user modules 442 and no mezzanines 440.

By allowing system 100 to be gradually upgraded according to desired security level, embodiments of the present disclosure provide a scalable (in terms of cost, security level, and number of elements of system 100) and secure federated computing system architecture. Furthermore, the flexibility of the architecture allows users to upgrade elements of the system and/or the overall system security without having to resort to a complete system overhaul and retrofit, which is a highly desirable feature for end users and manufacturers subject to variable needs and levels of export regulation throughout the lifetime of a typical product and/or product line.

Figure 5:
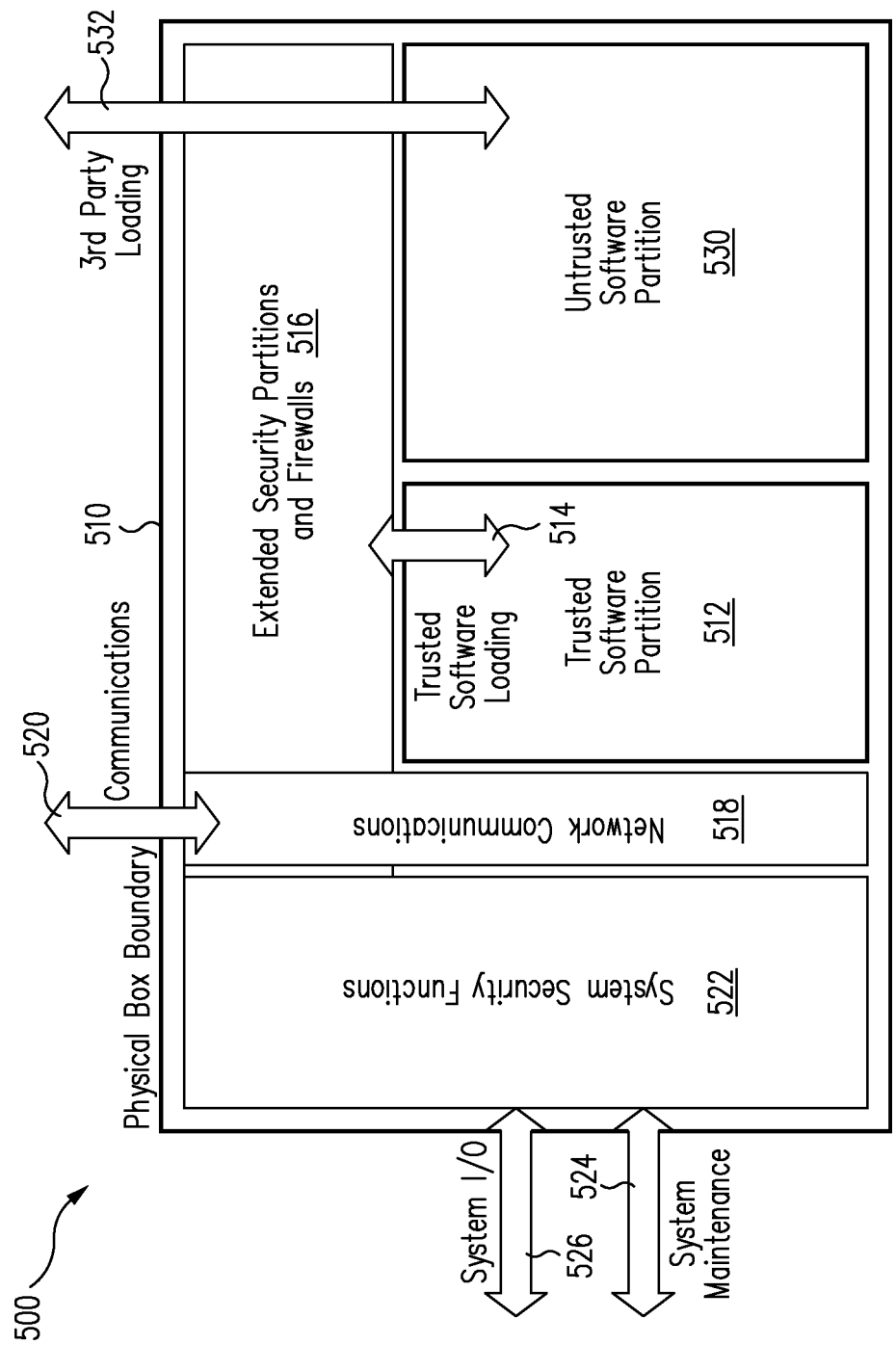
FIG. 5 illustrates an abstracted block diagram of a secure federated computing system in accordance with an embodiment of the disclosure.

FIG. 5 illustrates an abstracted block diagram 500 of secure federated computing system 100 in accordance with an embodiment of the disclosure. In the embodiment shown in FIG. 5, physical box boundary 510 may correspond to system enclosure 110 and the remaining features may correspond to abstracted functionality and system resources corresponding to SSC 120, user modules 140-146 (e.g., including any mezzanines 442), and system fabrics 160-166. For example, trusted software partition 512 and untrusted software partition 530 may be designated in a security rule set provided by SSC 120 to user modules 140-146, and each of user modules 140-146 may be configured with at least a portion of trusted software (e.g., secure execution and/or storage) partition 512 and/or untrusted software (e.g., non-secure execution and/or storage) partition 530. Trusted software and/or data can be provided to trusted software partition 512 (e.g., a portion of processor module 144) using a secure communication interface 514 (e.g., system fabric 162) through various communication partitions (e.g., security partitions and firewalls) 516, which may be configured to allocate communication resources of network communications 518 (e.g., switch module 140) and its interface 520 to other application and/or data sources as managed by system security functions 522 (e.g., applications, security rule sets, and/or other parameters corresponding to SSC 120). Other system I/O 526 and/or system maintenance 524 communications (e.g., to subsystems 150-156 and/or an external programming station) may also be managed and routed by system security functions 522 through various communication partitions 516 to software partitions 512 and 530 as appropriate. Unmanaged communications, executables, and/or data (e.g., 3$^{rd}$ party loading) 532 may traverse various communication partitions 516 but be limited in access to untrusted software partition 530. Each element shown in diagram 500 may be dynamically allocatable among the resources and functionality provided by system 100. The architecture illustrated in diagram 500 thus provides a secure, scalable (e.g., with allocatable system resources) and flexible federated computing system.

Figure 6:
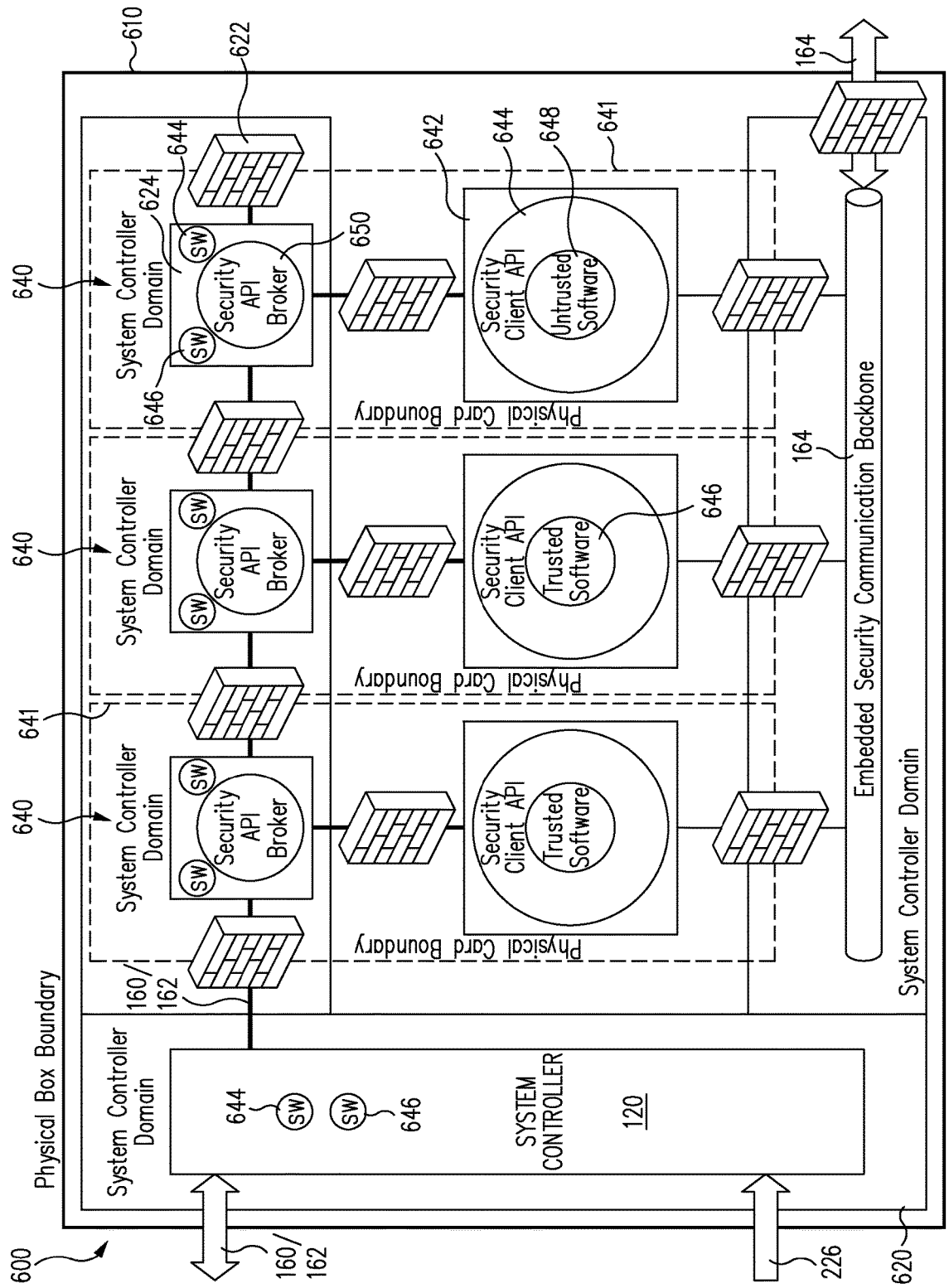
FIG. 6 illustrates a functional block diagram of a secure federated computing system in accordance with an embodiment of the disclosure.

FIG. 6 illustrates a functional block diagram of a secure federated computing system 600 in accordance with an embodiment of the disclosure. In particular, FIG. 6 shows how various system elements and corresponding functionality may be partitioned to allow non-secure/untrusted and/or unverified third party software installations to co-exist and be executed within the same federated computing system.

As shown in FIG. 6, system 600 is similar to system 100 and includes SSC 120 configured to communicate with and manage three user modules 640 (e.g., delineated by physical boundaries 641) over system fabric 160/162 and/or 164. Physical box boundary 610 may correspond to system enclosure 110 in FIG. 1. As indicated in FIG. 6, SSC 120 may be configured to allocate and/or manage system resources to form SSC domain 620 (e.g., shown as the rotated U-shaped shaded area within boundary 610) using one or more firewalls 622 to allow, deny, prioritize, and/or otherwise monitor and/or manipulate communication between SSC 120, user modules 640, execution, storage, and/or other system resources 642 within each user module 640, security system resources 624 within each user module 640, and along system fabrics 160/162 and/or 164.

Each user module 640 may be implemented with system resources 642 that can be allocated to a security client application interface 644 and trusted software 646 or untrusted software 648. In various embodiments, SSC 120 may be configured to control security system resources 624 of each user module (e.g., corresponding to portions of user module 340 and/or mezzanine 440, if present) to implement firewalls 622 between system resources 642 and system fabrics 160/162 and/or 164 to manage communications from or to system resources 642, for example, and/or to implement firewalls 622 between user modules 640 and/or SSC 120 to manage other communications along system fabrics 160/162 and/or 164.

Security system resources 624 of each user module 640 may include portions and/or copies of security client application interface 644 particular to that user module 640 and/or provided by SSC 120, for example, in addition to security application interface broker 650 and/or portions and/or copies of trusted software 646, which may include trusted security functions and/or data. Typically, untrusted software 648 is not allowed to reside within security system resources 624 and must instead be communicated to a user module 640 over a system fabric or external interface (e.g., which may be managed by SSC 120) or reside within that user module 640, such as a COTS user module coupled with a mezzanine.

Security application interface broker 650 may be configured to request and/or receive security client application interface 644 and/or trusted software 646 from SSC 120 particular to the specific user module 640 and/or a security rule set disposed within SSC 120. Security client application interface 644 may be configured to translate system management commands and secure system resource requests (e.g., as determined relative to a security rule set) to corresponding commands/resource requests recognized by user module 640, trusted software 646, and/or untrusted software 648. In some embodiments, SSC 120 and/or security application interface broker 650 may be configured to generate security client application interface 644 based on open application interface standards and/or querying trusted software 646 and/or untrusted software 648 and parsing corresponding responses for application interface parameters and/or characteristics (e.g., function calls and/or data types).

As shown, SSC 120 may include portions and/or copies of security client application interface 644 and/or trusted software 646, for example, to implement common security functions and/or for distribution to user modules 640 upon system initialization. In some embodiments, trusted software 646 may include at least a portion of a security rule set.

SSC 120 may also be implemented with its own external interface/bus 226, which may be used to interface with an external programming station to provide security client application interface 644 and/or trusted software 646

The security posture of the architecture as a whole may be scaled for platform requirements by simply adding or removing secured user modules and/or mezzanines coupled with COTS user modules. In some embodiments, all security elements of the architecture may be configured to communicate on a segregated security fabric (e.g., security fabric 160/162) that COTS user modules and/or untrusted software 648 will not have access to, therefore assuring an overall desired security level or posture is met. Trusted software 646 may be isolated and updated independent of the execution partition identified to host untrusted software 648. Customer-developed software (e.g., untrusted software 648) may therefore be hosted in isolation from mission system software (e.g., trusted software 646). In some embodiments, communications to and from the mission system software is limited to security client application interface 644, which may be controlled by the mission system software. In related embodiments, no direct external I/O control and/or communications is allowed to the mission system software. For example, each user module 640 may be configured with a firewall controlling ingoing and outgoing traffic between itself and security application interface broker 650 and/or between security application interface brokers 650, as shown. In various embodiments, SSC 120 may be configured to allocate additional execution resources from multiple sources based on requests from trusted and untrusted software, which can provide isolation of system capabilities between user modules 640 and allows applications to choose their execution resources of choice.

Figure 7:
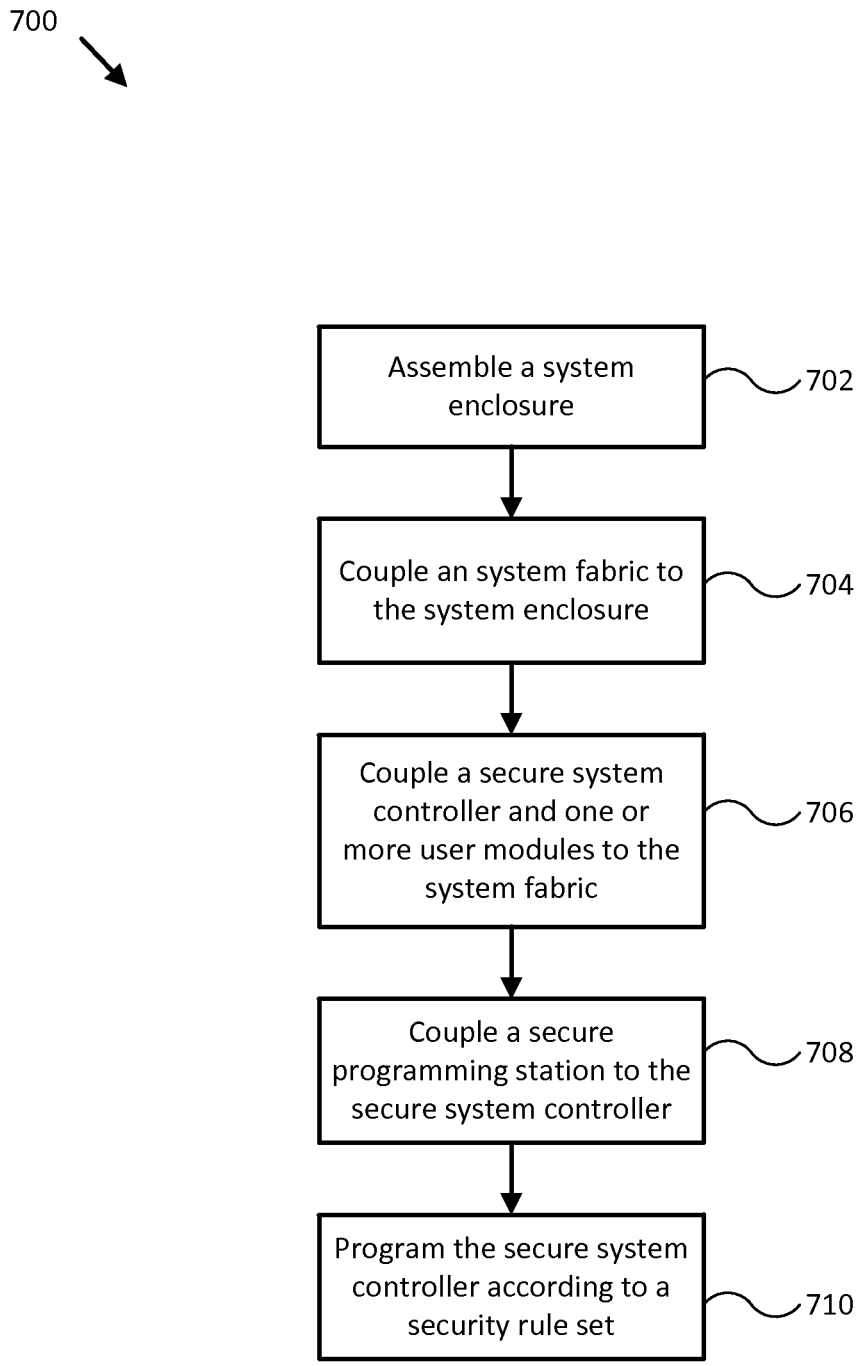
FIG. 7 illustrates a flow diagram of various operations to assemble a secure federated computing system in accordance with an embodiment of the disclosure.

FIG. 7 illustrates a flow diagram 700 of various operations to assemble a secure federated computing system in accordance with an embodiment of the disclosure. In some embodiments, the operations of FIG. 7 may be implemented as software instructions executed by one or more logic devices associated with corresponding elements of FIGS. 1-4. More generally, the operations of FIG. 7 may be implemented with any combination of software instructions and/or electronic hardware (e.g., inductors, capacitors, amplifiers, or other analog and/or digital components). Any step, sub-step, sub-process, or block of process 700 may be performed in an order or arrangement different from the embodiments illustrated by FIG. 7. For example, in other embodiments, one or more blocks may be omitted from the various processes, and blocks from one process may be included in another process. Furthermore, block inputs, block outputs, and/or other operational parameters may be stored prior to moving to a following portion of a corresponding process. Although process 700 is described with reference to elements of FIGS. 1-4, process 700 may be performed by other elements and including a different selection of user modules, system fabrics, and/or subsystems.

In optional block 702, a system enclosure is assembled. For example, during a complete retrofit or initial assembly of a mobile structure, system enclosure 110 may be assembled to house and/or support SSC 120, user modules 140-146, and/or portions of system fabrics 160-166. In such embodiments, system enclosure 110 may be mounted to or within a chassis of a mobile structure, such as an aircraft, after or during assembly. In alternative embodiments, block 702 may be omitted to limit expense and/or rely on hybrid system fabrics, as described herein.

In optional block 704, a system fabric is coupled to the system enclosure assembled in block 704. For example, if system enclosure 110 is assembled as described in block 702, a system fabric, such as a high speed system fabric, may be installed or otherwise coupled within system enclosure 110. In some embodiments, block 704 may include coupling a secure fabric controller (e.g., similar to secure fabric controller 226) to the system fabric coupled to system enclosure 110. In alternative embodiments, block 704 may be omitted to limit expense and/or rely on already installed system fabrics, as described herein.

In block 706, a secure system controller and one or more user modules are coupled to the system fabric. For example, SSC 120 and one or more user modules 340 may be installed into or otherwise coupled to system fabric 160, 162, and/or 164 of system enclosure 110 to form secure federated computing system 100 of FIG. 1. In some embodiments, one or more of the user modules may be provided in the form of COTS user module 442 and be coupled to mezzanine 440 prior to installation into system enclosure 110. In such embodiments, system fabric 160, 162, and/or 164 may be configured to allow various elements of system 100 to communicate with each other, as managed by SSC 120.

In block 708 a secure programming station is coupled to the SSC installed in block 706. For example, an external programming station may be coupled to SSC 120 over external bus 266 of FIG. 2. In some embodiments, the secure and/or external programming station may include one or more security keys and/or biometrics that may be used to authenticate the programming station to SSC 120 and/or SSC 120 to the programming station once the programming station is coupled to SSC 120. In such embodiments, once such authentication is completed, the process 700 may proceed to block 710.

In block 710, the secure system controller installed in block 706 is programmed according to a security rule set. For example, SSC 120 may be programmed by the secure programming station coupled to SSC 120 over external bus 266, as described with reference to block 708. As part of such programming, the external programming station may provide a security rule set to SSC 120, where the security rule set includes one or more communication, I/O, execution, storage, and/or other security partition associated with one or more elements of system 100. For example, a communication partition may include one or more firewalls, as described herein. In various embodiments, the security rule set may include one or more security protocols, device characteristics, application characteristics, user module and/or mezzanine security keys, resource allocations and/or limits, and/or other security parameters associated with one or more security partitions and/or elements of system 100. In some embodiments, a security rule set may include application and/or device characteristics that may be used to differentiate trusted and untrusted software or data, secure and non-secure user modules and/or other devices on a system fabric, and/or determine a security status of corresponding system resource requests. Such security status may be used to designate a particular security partition and corresponding system resources in response to such system resource requests.

Figure 8:
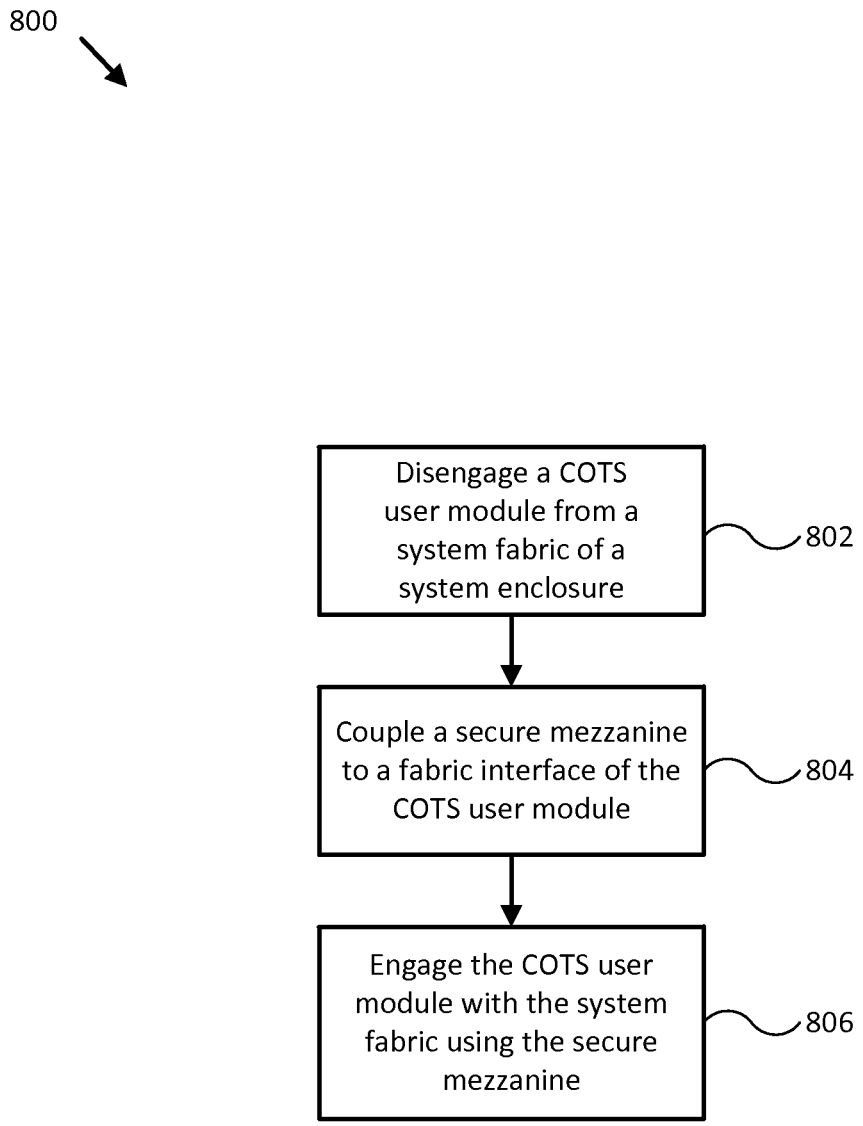
FIG. 8 illustrates a flow diagram of various operations to assemble a secure federated computing system in accordance with an embodiment of the disclosure.

FIG. 8 illustrates a flow diagram 800 of various operations to assemble a secure federated computing system in accordance with an embodiment of the disclosure. In particular, FIG. 8 describes a method for upgrading a COTS user module with a mezzanine. The operations of FIG. 8 may be implemented as software instructions executed by one or more logic devices associated with corresponding elements of FIGS. 1-4 or with any combination of software instructions and/or electronic hardware (e.g., inductors, capacitors, amplifiers, or other analog and/or digital components). Any step, sub-step, sub-process, or block of process 800 may be performed in an order or arrangement different from the embodiments illustrated by FIG. 8.

In block 802, a COTS user module is disengaged from a system fabric of a system enclosure. For example, prior to upgrading a federated computing system, COTS user module 442 may be removed from system enclosure 110 and thereby disengaged from system fabrics 160, 162, and/or 164.

In block 804, a secure mezzanine is coupled to a fabric interface of the COTS user module disengaged from the system enclosure in block 802. For example, COTS interface of mezzanine 440 may be coupled to fabric interface/bus 460 and/or 464 of COTS user module 442, as shown in FIG. 4.

In block 806, the COTS user module is engaged with the system fabric of block 802 using the secure mezzanine provided in block 804. For example, in one embodiment, the combined assembly of COTS user module 442 and mezzanine 440 may be inserted or installed into system enclosure 110 in an action that is a reversed form of block 802. COTS user module 442 may then communicate with other user modules, SSC 120, and/or system fabrics 160, 162, and/or 164 of system 100 through mezzanine 440 as managed by SSC 120. In alternative embodiments, mezzanine 440 may first be installed into system enclosure 110 and then COTS user module 442 coupled to mezzanine 440. A similar method may be used to upgrade a system controller to SSC 120 (e.g., or a COTS system controller coupled with mezzanine 440). Thus, embodiments of the present disclosure provide a relatively simple upgrade path to increase overall security of a federated computing system.

Figure 9:
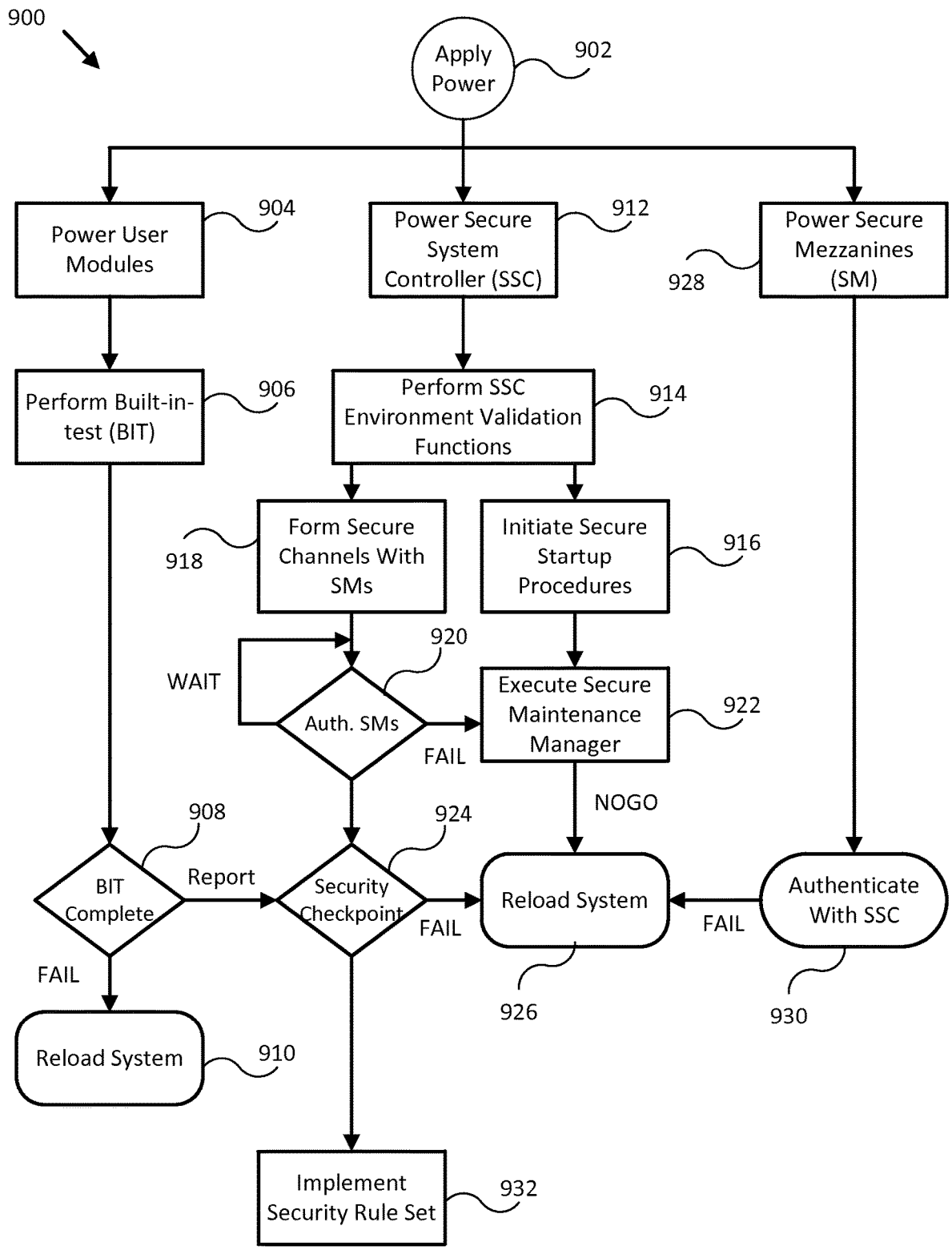
FIG. 9 illustrates a flow diagram of various operations to initialize and/or operate a secure federated computing system in accordance with an embodiment of the disclosure.

FIG. 9 illustrates a flow diagram 900 of various operations to initialize and/or operate a secure federated computing system in accordance with an embodiment of the disclosure. The operations of FIG. 9 may be implemented as software instructions executed by one or more logic devices associated with corresponding elements of FIGS. 1-4 or with any combination of software instructions and/or electronic hardware (e.g., inductors, capacitors, amplifiers, or other analog and/or digital components). Any step, sub-step, sub-process, or block of process 900 may be performed in an order or arrangement different from the embodiments illustrated by FIG. 9.

In block 902, power is applied to system 100. For example, power may be applied to system enclosure 110 when a user activates system 100 or activates a mobile structure associated with system 100, such as an aircraft.

In block 904, the power applied in block 902 is used to power user modules. For example, each of user modules 140-146 of system 100 may be powered in block 904. In some embodiments, both secure and non-secure user modules may be powered. In block 906, each user module performs a performance built-in-test (BIT) to determine whether the user module is operating properly. The BITs allow the user modules to independently test themselves to determine if standard or predetermined requirements, such as internal functionality, are met. In block 908, each user module determines whether its BIT completed successfully or if the BIT failed or timed out. If any BIT fails, process 900 proceeds to block 910 to reload or reboot system 100. In some embodiments, a time delayed counter may be used to track system reloads and remove power from system 100 if a maximum number of reloads is met within a predetermined period of time. In other embodiments, system 100 may be configured to only proceed to block 910 if certain user modules or a maximum number of user modules fail their BIT or time out. As each BIT completes, each corresponding user module reports the completion along with any corresponding BIT parameters (e.g., activated and available capabilities, security protocols and/or status) to block 924, which may be executed by one or more of SSC 120 and/or secure system processors of user modules 340 or mezzanines 440, for example.

In block 928, the power applied in block 902 is used to power secure mezzanines (SMs). For example, for every COTS user module 442 in system 100, a corresponding mezzanine 440 is powered in block 928. In block 930, the mezzanines 440 attempt to authenticate with SSC 120 (e.g., see block 920). For example, mezzanine 440 may attempt to communicate with SSC 120 over system fabric 162 using one or more secure keys to encrypt and/or authenticate the communication, to authenticate mezzanine 440 to SSC 120, and/or to authenticate SSC 120 to mezzanine 440. In some embodiments, such authentication may be allowed or denied based on a security rule set, for example, and/or other parameters programmed into SSC 120. If any SM fails to authenticate with SSC 120, process 900 proceeds to block 926 to reload or reboot system 100. In some embodiments, system 100 may be configured to only proceed to block 926 if certain mezzanines or a maximum number of mezzanines fail to authenticate with SSC 120.

In block 912, the power applied in block 902 is used to power a secure system controller (SSC). For example, SSC 120 may be powered and then proceed to execute the remaining portions of process 900. In various embodiments, blocks 904, 912, and 928 may be performed substantially in parallel. In block 914, SSC 120 performs SSC environment validation functions (e.g., similar to a BIT for the user modules) to ensure SSC 120 is operating properly, can access system fabrics 160, 162, and/or 164, and is able to perform the remaining portions of process 900.

In block 916, SSC 120 initiates a secure startup procedure. For example, SSC 120 may be configured to generate public keys, access a security rule set and/or other security parameters stored within SSC 120, power and/or validate operation of secure fabric controller 226, and/or perform other secure startup procedures. In block 918, which may be executed substantially in parallel with block 916, SSC 120 attempts to form secure communication channels between SSC 120 and the mezzanines powered in block 928. For example, SSC 120 may be configured to exchange public keys with mezzanines 440 to form encrypted and/or authenticated communication channels between SSC 120 and mezzanines 440. In block 920, SSC 120 attempts to authenticate the mezzanines using the secure channels formed in block 918, and does so for a predetermined period of wait time. If any one of the mezzanines fails to authenticate with SSC 120 (or vice versa) at the expiration of the predetermined wait time, block 920 reports the failure to block 922. In block 922, SSC 120 executed a secure maintenance manager, which evaluates the security status of system 100. If the secure maintenance manager receives sufficient failure reports from block 920, process 900 proceeds to block 926 (e.g., "NOGO") to reload or reboot system 100.

In some embodiments, block 918 may include attempts to form secure communication channels with secure user modules (e.g., user modules 340) installed in system 100 in a similar fashion. Alternatively, blocks 906 and/or 908 may be used to test capability of user modules 340 to conform to the requirements of block 918 and/or 920. COTS user modules without mezzanines may simply report BIT status as shown.

As shown in FIG. 9, each successful authentication of mezzanines (and/or secure user modules) with SSC 120 in block 920 is reported to block 924. In block 924, SSC 120 executes a security checkpoint that evaluates the BIT reports from block 908 and the authentication reports from block 920. If either or both are insufficient as indicated in a security rule set and/or other security parameters stored within SSC 120, process 900 proceeds to block 926 to reload or reboot system 100. If either or both are sufficient as indicated in a security rule set and/or other security parameters stored within SSC 120, process 900 proceeds to block 932. In block 932, SSC 120 implements a security rule set, as described herein.

Figure 10:
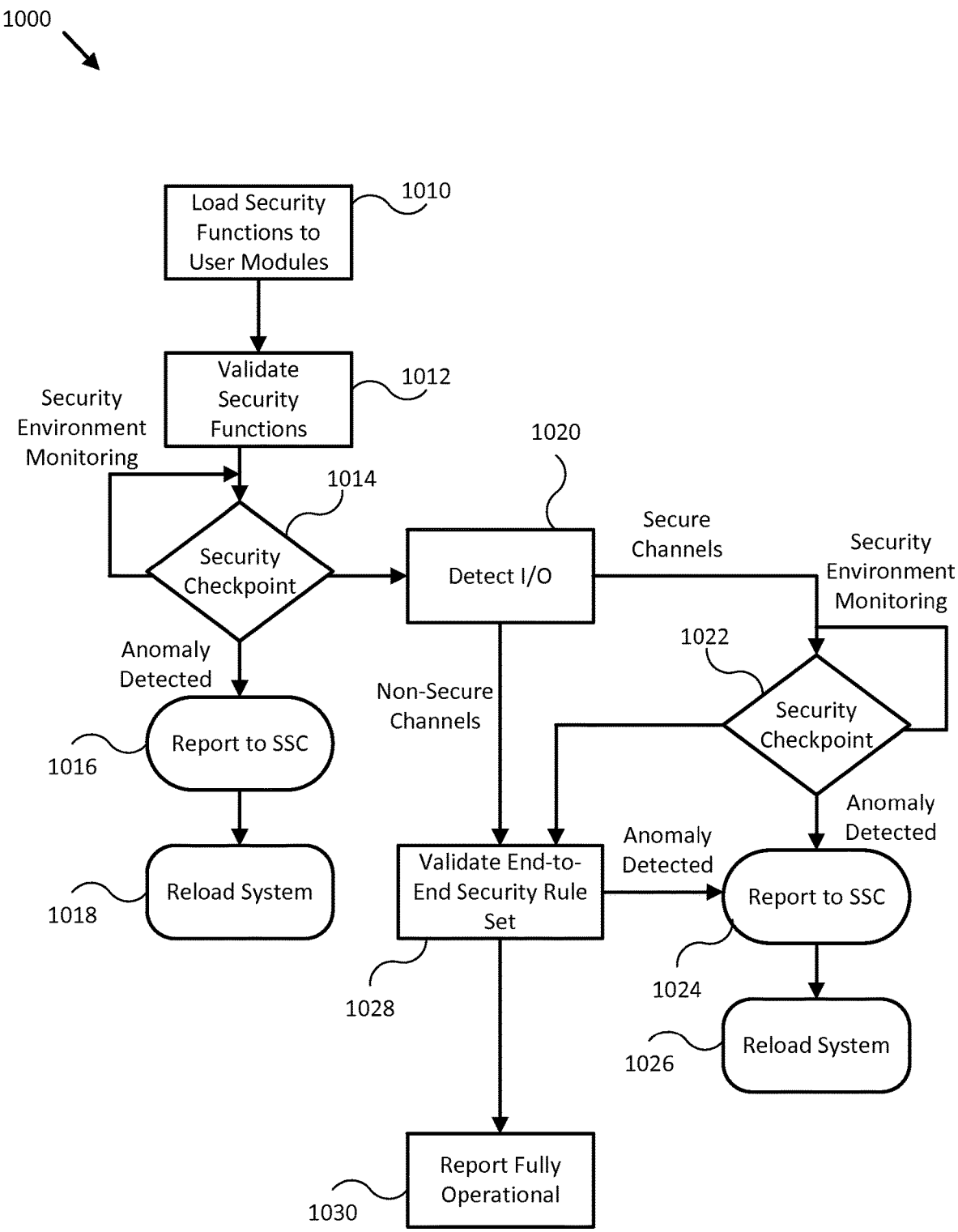
FIG. 10 illustrates a flow diagram of various operations to initialize and/or operate a secure federated computing system in accordance with an embodiment of the disclosure.

FIG. 10 illustrates a flow diagram 1000 of various operations to initialize and/or operate a secure federated computing system in accordance with an embodiment of the disclosure. The operations of FIG. 10 may be implemented as software instructions executed by one or more logic devices associated with corresponding elements of FIGS. 1-4 or with any combination of software instructions and/or electronic hardware (e.g., inductors, capacitors, amplifiers, or other analog and/or digital components). Any step, sub-step, sub-process, or block of process 1000 may be performed in an order or arrangement different from the embodiments illustrated by FIG. 10.

In block 1010, SSC 120 loads security functions to user modules. For example, SSC 120 may be configured to load security functions, such as functions to implement security partitions and/or other aspects of a security rule set or security parameters, to user modules 140-146 over secure communications channels formed in block 918 of FIG. 9. In various embodiments, each user module will typically require a particular set of security functions related to the type and function of the user module, as described herein. In some embodiments, the user modules may be implemented as COTS user modules couple with mezzanines, for example, and the security functions may be loaded to the mezzanines. In block 1012, SSC 120 validates the security functions loaded in block 1010. For example, SSC 120 may be configured to validate the security functions loaded in block 1010 by calling a particular security function loaded to a particular user module and evaluating the response according to criteria provided in an associated security rule set and/or other security parameters. Process 1014 then proceeds to block 1014 where SSC 120 and/or another secure system processor in system 100 executes a security checkpoint to monitor the security environment of system 100 and/or portions of system 100 (e.g., over a predetermined period of time), which includes the results of the validations performed in block 1012. If an anomaly is detected by a non-SSC secure system processor (e.g., of a secure user module or a mezzanine), the anomaly is reported to SSC 120 in block 1016 and process 1000 proceeds to block 1018 to reload or reboot system 100. If an anomaly is detected by SSC 120, process 1000 proceeds directly to block 1018.

If no anomaly is detected, process proceeds to block 1020, where SSC 120 detects I/O within system 100, such as a system resource request transmitted over any of system fabrics 160-166. If SSC 120 determines the I/O was transmitted over a non-secure channel, process 1000 proceeds to block 1028 to validate the non-secure I/O with respect to the appropriate security rule set. If SSC 120 determines the I/O was transmitted over a secure channel, process 1000 proceeds first to block 1022 to determine whether the security status of system 100 is operational and then to block 1028 to validate the secure I/O with respect to the appropriate security rule set. If SSC 120 or any secure system processor 220 of system 100 detects an anomaly in the security status of system 100 at block 1022, or SSC detects an anomaly in the validation performed in block 1028, process 1000 proceeds through blocks 1024 and/or 1026 to reload or reboot system 100, If SSC 120 successfully validates the secure or non-secure I/O with respect to the appropriate security rule set, process 1000 proceeds to block 1030 where SSC 120 and/or other security components of system 100 report system 100 as fully operational. In some embodiments, block 1030 may also allocate system resources in response to a system resource request (e.g., the I/O detected in block 1020).

Figure 11:
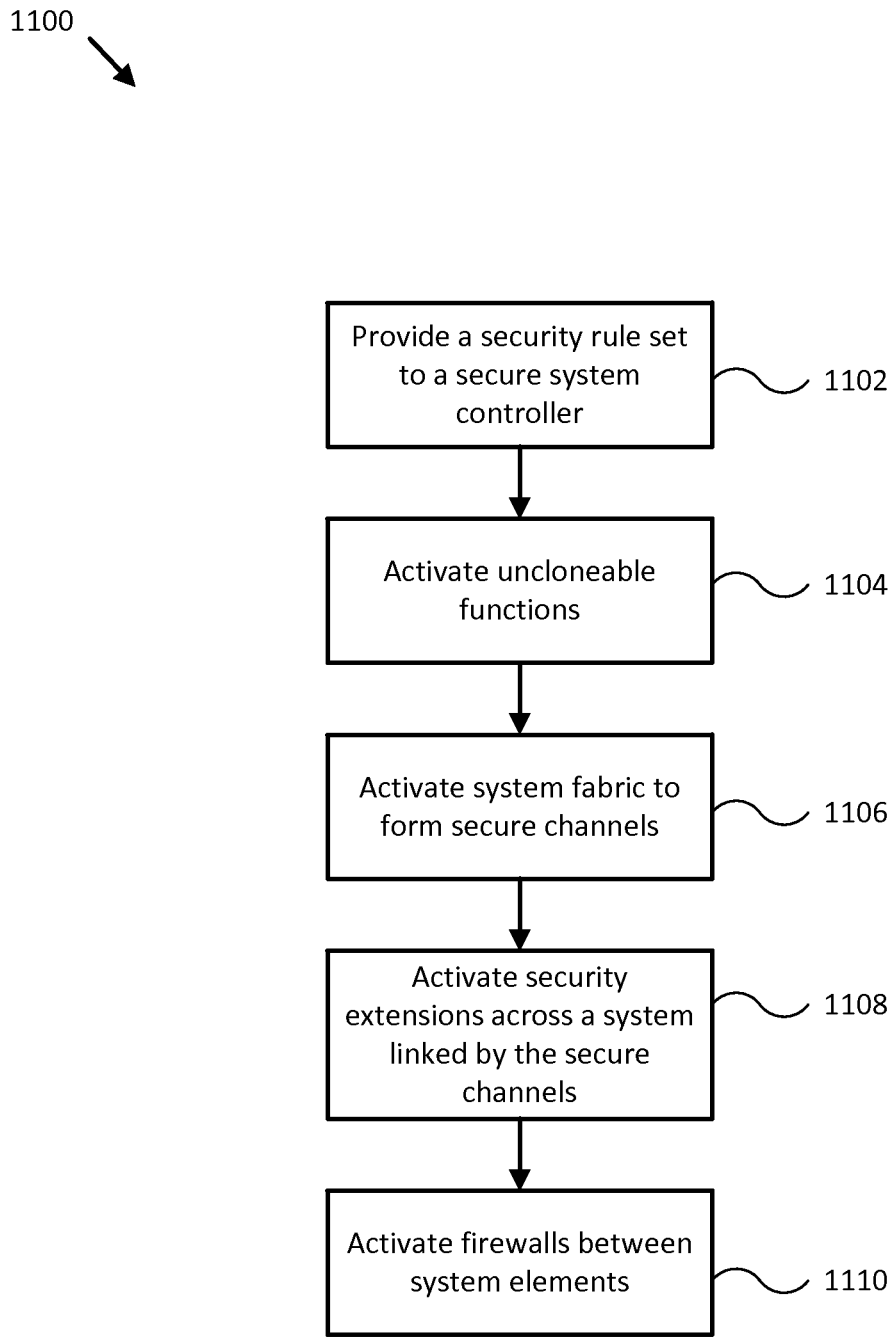
FIG. 11 illustrates a flow diagram of various operations to initialize and/or operate a secure federated computing system in accordance with an embodiment of the disclosure.

FIG. 11 illustrates a flow diagram 1100 of various operations to initialize and/or operate a secure federated computing system in accordance with an embodiment of the disclosure. In particular, FIG. 11 described a process to provide secure communication channels between elements of a secure federated computing system. The operations of FIG. 11 may be implemented as software instructions executed by one or more logic devices associated with corresponding elements of FIGS. 1-4 or with any combination of software instructions and/or electronic hardware (e.g., inductors, capacitors, amplifiers, or other analog and/or digital components). Any step, sub-step, sub-process, or block of process 1100 may be performed in an order or arrangement different from the embodiments illustrated by FIG. 11.

In block 1102, a programming station provides a security rule set to a secure system controller. For example, SSC 120 may be configured to receive a security rule set from a programming station over external bus 266 in FIG. 2. Such security rule set may include one or more security partitions and/or other security parameters, as described herein. In particular, such security rule set may include one or more communication partitions, as described herein. In various embodiments, the security rule set is configured to allow SSC 120 to aid in communications between user modules 140-146 and/or subsystems 150-156 in system 100.

In block 1104, SSC 120 and/or other security devices in system 100 activate their unclonable functions. For example, unclonable functions may be configured to implement challenge-response authentication protocols where each device provides a unique but repeatable response to a particular challenge. Such functions, along with other functions discussed herein, may be used to enable device identification and authentication, bind software to hardware platforms, and secure storage of cryptographic information. In particular, such functions may be used to form secure communication channels between elements of system 100. In some embodiments, secure keys 270, 272, and 274 may be implemented using one or more unclonable functions.

In block 1106, SSC 120 activates system fabric 160 and/or 162 to form secure communication channels between elements of system 100. For example, SSC 120 may be configured to use secure fabric controller 226 to activate system fabric 160 and/or 162 and to use the uncloneable functions activated in block 1104 to form secure communication channels between elements of system 100, as described herein.

In block 1108, SSC 120 and/or other security devices in system 100 activate security extensions or functions across elements of system 100 linked by the secure communication channels formed in block 1106.

In block 1110, SSC 120 and/or other security devices in system 100 activate firewalls between elements of system 100. For example, SSC 120, secure modules 340, and/or mezzanines 440 may be configured to activate firewalls between various elements of system 100, as described herein. In some embodiments, a firewall may be activated between a mezzanine 440 and its corresponding COTS user module 442, and/or between various system and/or security resources of a secure user module 340 and/or a mezzanine 440 and a corresponding COTS user module 442, such as the firewalls 622 shown in FIG. 6. Thus, embodiments of the present disclosure may be configured to provide secure communications between elements of a federated computing system.

Figure 12:
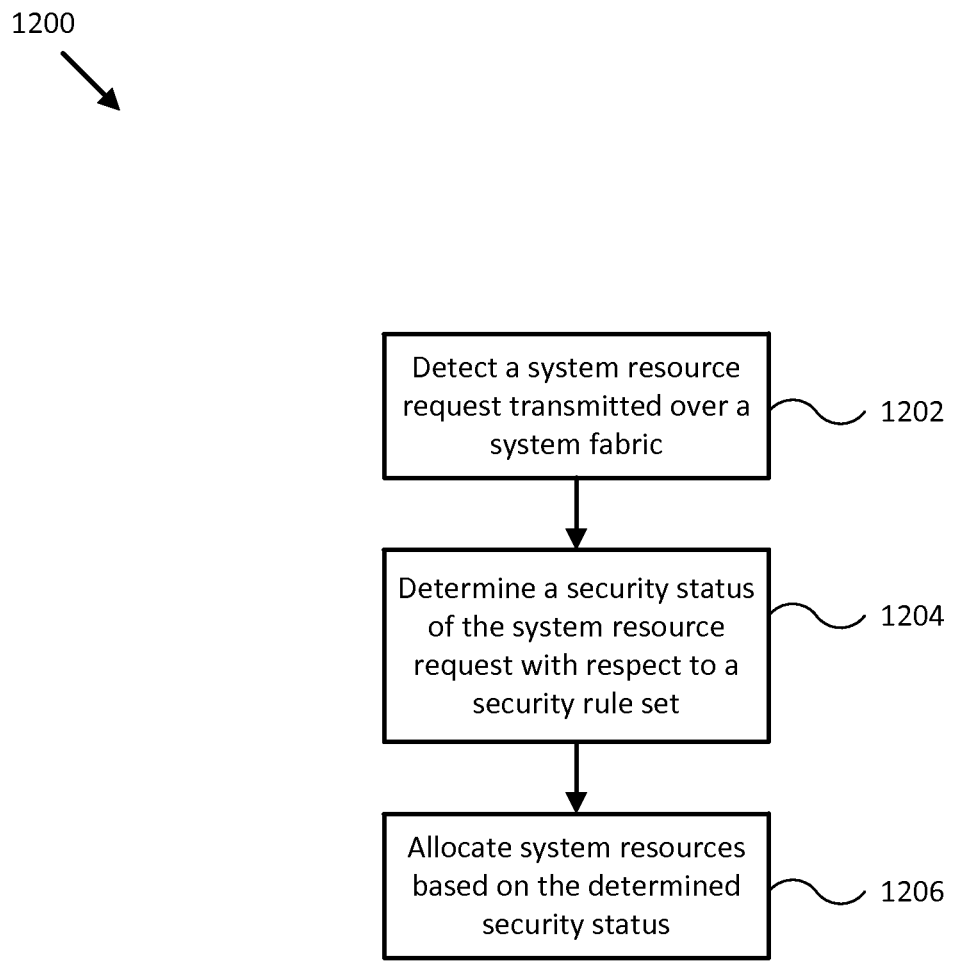
FIG. 12 illustrates a flow diagram of various operations to initialize and/or operate a secure federated computing system in accordance with an embodiment of the disclosure.

FIG. 12 illustrates a flow diagram 1200 of various operations to initialize and/or operate a secure federated computing system in accordance with an embodiment of the disclosure. The operations of FIG. 12 may be implemented as software instructions executed by one or more logic devices associated with corresponding elements of FIGS. 1-4 or with any combination of software instructions and/or electronic hardware (e.g., inductors, capacitors, amplifiers, or other analog and/or digital components). Any step, sub-step, sub-process, or block of process 1200 may be performed in an order or arrangement different from the embodiments illustrated by FIG. 12.

In block 1202, SSC 120 detects a system resource request transmitted over the system fabric. For example, SSC 120 may be configured to detect a system resource request transmitted by user modules 140-146 and/or subsystems 150-156 over system fabrics 160-164 by monitoring communications on system fabrics 160-164 and/or by receiving a direct system resource request. Such system resource request may include a request for communication bandwidth, for particular I/O from a sensor or other subsystem, for processing time or bandwidth, for storage space, and/or for other system resources.

In block 1204, SSC 120 determines a security status of the system resource request detected in block 1202 with respect to a security rule set. For example, SSC 120 may be configured to determine a security status of a requested communication resource, I/O resource, processing resource, storage resource, and/or other system resource as compared to one or more communication, I/O, execution, storage, and/or other system resource or security partition associated with user modules 140-146. In various embodiments, SSC 120 may be configured to determine whether the requesting device or application has access to the corresponding system resource and/or security partition based on one or more attributes of the requesting device, a status of system 100, and/or the security rule set.

In block 1206, SSC 120 allocates system resources based, at least in part, on the determined security status of the system resource request. For example, SSC 120 may be configured to allocate communication resources, I/O resources, processing resources, storage resources, and/or other system resources by allowing, denying, prioritizing, and/or otherwise controlling access to the system resources based on the requesting devices access to the system resources as dictated by the security rule set and/or a status of system 100. For example, a request by an untrusted application for secure system resources may be denied, or SSC 120 may be configured to adjust related security partitions to re-allocate the secure system resources to unsecure system resources and allow access to the untrusted application, up to acceptable ranges indicated by the appropriate security rule set. Thus, embodiments of the present disclosure provide a secure, scalable, and flexible federated computing system architecture that can be configured to dynamically reallocate system resources as needed.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method, comprising:
   detecting a system resource request transmitted over a system fabric;
   determining a security status of the system resource request with respect to a security rule set, wherein the security rule set comprises at least one of communication, input/output (I/O), or execution partitions associated with a plurality of user modules each comprising a corresponding security application interface broker, wherein each of the plurality of user modules are securely isolated from one another via a firewall and physically partitioned from one another within a system enclosure, and wherein each of the plurality of user modules are separately removable from the system enclosure; and
   allocating system resources for at least one of the plurality of user modules, using at least one of the corresponding security application interface brokers, based, at least in part, on the determined security status of the system resource request,
   wherein the user modules are configured to be coupled within the system enclosure, the system enclosure is configured to be mounted to or within a mobile structure, and the mobile structure comprises a commercial aircraft, a private aircraft, a ground vehicle, a military aircraft, a rotorcraft, and/or an unmanned vehicle.

2. The method of claim 1, further comprising:
   forming secure communications channels between the user modules and a security system controller over the system fabric; and
   authenticating the user modules using the secure communications channel prior to detecting the system resource request.

3. The method of claim 2, further comprising:
   loading security functions to the user modules over the secure communications channels; and validating the loaded security functions with respect to the secure communications channels and/or the security rule set prior to detecting the system resource request.

4. The method of claim 1, wherein one of the user modules comprises a commercial-off-the-shelf (COTS) user module coupled to a mezzanine mounted within the system enclosure, the method further comprising:
forming a secure communications channel between the mezzanine and the security system controller over the system fabric; and
authenticating the mezzanine using the secure communications channel prior to detecting the system resource request.

5. The method of claim 4, further comprising:
loading security functions to the mezzanine over the secure communications channel; and
validating the loaded security function with respect to the secure communications channel and/or the security rule set prior to detecting the system resource request.

6. The method of claim 1, further comprising:
determining the system resource request was transmitted over a secure communications channel; and
validating the system resource request with respect to the secure communications channel and the security rule set prior to determining the security status of the system resource request.

7. The method of claim 1, further comprising:
determining the system resource request was transmitted over a non-secure communications channel; and
validating the system resource request with respect to the security rule set prior to determining the security status of the system resource request.

8. The method of claim 1, wherein:
the system fabric is implemented according to PCI Express, Infiniband, Serial Rapid I/O, Ethernet, 10 Gb Ethernet, Fibre Channel, 1553, CANBus, WiFi, Bluetooth, Zigbee, Xbee, and/or Micronet.

9. A system, comprising:
a plurality of user modules configured to communicate with each other over a system fabric, wherein each of the plurality of user modules comprises a corresponding security application interface broker, and
wherein each of the plurality of user modules are securely isolated from one another via a firewall and physically partitioned from one another within a system enclosure, and
wherein each of the plurality of user modules are separately removable from the system enclosure; and
a secure system controller adapted to couple to the system fabric, wherein the secure system controller is configured to:
detect a system resource request transmitted over the system fabric;
determine a security status of the system resource request with respect to a security rule set, wherein the security rule set comprises at least one of communication, input/output (I/O), or execution partitions associated with the plurality of user modules; and
allocate system resources for at least one of the plurality of user modules, using at least one of the corresponding security application interface brokers, based, at least in part, on the determined security status of the system resource request,
wherein the user modules are configured to be coupled within the system enclosure, the system enclosure is configured to be mounted to or within a mobile structure, and the mobile structure comprises a commercial aircraft, a private aircraft, a ground vehicle, a military aircraft, a rotorcraft, and/or an unmanned vehicle.

10. The system of claim 9, wherein the secure system controller is configured to:
form secure communications channels between the user modules and the security system controller over the system fabric; and
authenticate the user modules using the secure communications channel prior to detecting the system resource request.

11. The system of claim 10, wherein the secure system controller is configured to:
load security functions to the user modules over the secure communications channels; and
validate the loaded security functions with respect to the secure communications channels and/or the security rule set prior to detecting the system resource request.

12. The system of claim 9, wherein one of the user modules comprises a commercial-off-the-shelf (COTS) user module coupled to a mezzanine mounted within the system enclosure, and wherein the secure system controller is configured to:
form a secure communications channel between the mezzanine and the security system controller over the system fabric; and
authenticate the mezzanine using the secure communications channel prior to detecting the system resource request.

13. The system of claim 12, wherein the secure system controller is configured to:
load security functions to the mezzanine over the secure communications channel; and
validate the loaded security function with respect to the secure communications channel and/or the security rule set prior to detecting the system resource request.

14. The system of claim 9, wherein the secure system controller is configured to:
determine the system resource request was transmitted over a secure communications channel; and
validate the system resource request with respect to the secure communications channel and the security rule set prior to determining the security status of the system resource request.

15. The system of claim 9, wherein the secure system controller is configured to:
determine the system resource request was transmitted over a non-secure communications channel; and
validate the system resource request with respect to the security rule set prior to determining the security status of the system resource request.

16. The system of claim 9, wherein the secure system controller is configured to be coupled within the system enclosure.

17. The system of claim 9, wherein:
the secure system controller and the user modules each comprise a secure system processor; and
each secure system processor comprises a security key integrated with the secure system processor.

18. A method, comprising:
coupling a secure system controller and a plurality of user modules to a system fabric for a federated computing system;
coupling a secure programming station to the secure system controller; and
programming the secure system controller according to a security rule set, wherein the security rule set comprises at least one of communication, input/output (I/O), or execution partitions associated with the plurality of user modules, each comprising a corresponding security application interface broker, wherein each of the plurality of user modules are securely isolated from one another via a firewall and physically partitioned from one another within a system enclosure, and wherein each of the plurality of user modules are separately removable from the system enclosure, wherein the secure system controller is operable to allocate system resources for at least one of the plurality of user modules, using at least one of the corresponding security application interface brokers, and wherein the user modules are configured to be coupled within the system enclosure, the system enclosure is configured to be mounted to or within a mobile structure, and the mobile structure comprises a commercial aircraft, a private aircraft, a ground vehicle, a military aircraft, a rotorcraft, and/or an unmanned vehicle.

19. The method of claim 18, further comprising:

disengaging a commercial-off-the-shelf (COTS) user module from the system fabric;

coupling a mezzanine to a fabric interface of the COTS user module; and engaging the COTS user module with the system fabric using the mezzanine, prior to coupling the secure system controller and the user modules to the system fabric.

20. The method of claim 18, wherein the secure system controller is configured to be coupled within the system enclosure.

* * * * *